US009059954B1

(12) United States Patent
Cohen

(10) Patent No.: US 9,059,954 B1
(45) Date of Patent: Jun. 16, 2015

(54) EXTRACTING INDIRECT RELATIONAL INFORMATION FROM EMAIL CORRESPONDENCE

(76) Inventor: Hunter C. Cohen, Water Mill, NY (US)

( * ) Notice: Subject to any disclaimer, the term of this patent is extended or adjusted under 35 U.S.C. 154(b) by 189 days.

(21) Appl. No.: 13/558,212

(22) Filed: Jul. 25, 2012

Related U.S. Application Data

(60) Provisional application No. 61/514,795, filed on Aug. 3, 2011.

(51) Int. Cl.
*G06F 15/16* (2006.01)
*H04L 12/58* (2006.01)

(52) U.S. Cl.
CPC ............ *H04L 51/14* (2013.01); *H04L 51/12* (2013.01)

(58) Field of Classification Search
CPC ......... H04L 51/12; H04L 51/14; H04L 51/22; H04L 51/32; H04L 51/38; H04L 51/63; H04L 41/26; H04L 12/585; H04L 12/5855; H04L 61/1547; H04L 67/1069; H04L 67/4038
USPC ................................. 709/203, 205, 206, 207
See application file for complete search history.

(56) References Cited

U.S. PATENT DOCUMENTS

| 7,231,427 | B1 * | 6/2007 | Du ................................ 709/206 |
|---|---|---|---|
| 7,472,110 | B2 | 12/2008 | Achlioptas ........................ 707/3 |
| 7,673,327 | B1 | 3/2010 | Polis et al. ........................ 726/5 |
| 7,707,122 | B2 | 4/2010 | Hull et al. ..................... 705/319 |
| 7,743,104 | B2 * | 6/2010 | Wetmore et al. ............... 709/206 |
| 7,761,549 | B2 | 7/2010 | Farnham et al. ............... 709/223 |
| 7,818,385 | B2 * | 10/2010 | Naick et al. .................... 709/206 |
| 7,881,243 | B2 * | 2/2011 | Hardy et al. .................... 370/312 |
| 7,917,576 | B1 * | 3/2011 | Kling ............................. 709/203 |
| 2003/0046546 | A1 * | 3/2003 | Endo .............................. 713/176 |
| 2004/0122681 | A1 * | 6/2004 | Ruvolo et al. ..................... 705/1 |
| 2004/0122803 | A1 * | 6/2004 | Dom et al. ........................ 707/3 |
| 2004/0122855 | A1 * | 6/2004 | Ruvolo et al. .............. 707/104.1 |
| 2004/0236837 | A1 * | 11/2004 | Sherwood ....................... 709/207 |
| 2005/0091320 | A1 * | 4/2005 | Kirsch et al. ................... 709/206 |
| 2005/0204159 | A1 * | 9/2005 | Davis et al. .................... 713/201 |
| 2006/0116139 | A1 * | 6/2006 | Appelman ..................... 455/466 |
| 2007/0033258 | A1 * | 2/2007 | Vasilaky et al. ............... 709/206 |
| 2007/0088787 | A1 * | 4/2007 | Hardy et al. .................. 709/206 |
| 2007/0198672 | A1 * | 8/2007 | Pak et al. ....................... 709/223 |
| 2008/0039052 | A1 * | 2/2008 | Knowles .................... 455/412.1 |
| 2009/0171748 | A1 | 7/2009 | Aven et al. ....................... 705/10 |
| 2009/0177744 | A1 | 7/2009 | Marlow et al. ................ 709/204 |
| 2009/0240776 | A1 * | 9/2009 | Cherian ......................... 709/206 |
| 2010/0174784 | A1 * | 7/2010 | Levey et al. ................... 709/206 |

(Continued)

*Primary Examiner* — Thu Ha Nguyen
(74) *Attorney, Agent, or Firm* — Pillsbury Winthrop Shaw Pittman LLP

(57) ABSTRACT

Correspondence, such as emails, is processed to develop a database of relationships between parties addressed on the correspondence including indirectly addressed parties such as those directly addressed in included, forwarded correspondence. The database may be used to determine the contact paths between users and addressed parties including the intermediary contacts required to complete contacts paths to selected addressed parties. Patterns of correspondence, including frequency and recency of correspondence may be detected and displayed. Statistically normal patterns of correspondence may be derived in order to determine if correspondence patterns for selected addressed parties deviate there from. Data associated with contact information, such as search result listings, may be filtered and ordered in accordance with contact path proximity and/or contact related preferences or attributes.

20 Claims, 16 Drawing Sheets

(56) References Cited

U.S. PATENT DOCUMENTS

| | | | |
|---|---|---|---|
| 2010/0280903 A1* | 11/2010 | Barlin et al. | 705/14.58 |
| 2011/0042453 A1* | 2/2011 | Jhanji | 235/375 |
| 2011/0196725 A1* | 8/2011 | Malcolmson et al. | 705/14.16 |
| 2012/0079049 A1* | 3/2012 | Rawat et al. | 709/206 |
| 2012/0158935 A1 | 6/2012 | Kishimoto et al. | 709/223 |
| 2013/0219000 A1* | 8/2013 | Hayes | 709/206 |
| 2013/0304833 A1* | 11/2013 | St. Clair et al. | 709/206 |
| 2013/0346526 A1* | 12/2013 | Rawat et al. | 709/206 |
| 2014/0040390 A1* | 2/2014 | Li et al. | 709/206 |

* cited by examiner

Relationship Tree

Fig. 22

EXTRACTING INDIRECT RELATIONAL INFORMATION FROM EMAIL CORRESPONDENCE

CROSS-REFERENCE TO RELATED APPLICATIONS

This application claims the benefit of U.S. Patent Application Ser. No. 61/514,795, entitled "Extracting Indirect Relational Information From Email Correspondence", filed Aug. 3, 2011, which is hereby incorporated by reference into the present disclosure in its entirety.

FIELD OF THE DISCLOSURE

This disclosure is related to extracting indirect relational information from email correspondence.

BACKGROUND

We have all had the experience of meeting someone for the first time and quickly discovering that you are "connected" by an unexpected chain of acquaintances, often a short chain of only two or three people. In fact this occurrence is so common that we have a catch phrase response that most everybody uses "It's a small world," and even a play based on the phenomena, John Guare's "Six Degrees of Separation."

With the U.S. population just over 290 million and almost 6 billion more in the rest of the world, how can this "small world phenomena" be such a common occurrence, and is there a way to systematically employ it to our benefit?

SUMMARY

One aspect of the disclosure may relate to a method for developing contact information from correspondence (e.g., emails). The method may include processing a set of correspondence to develop a database of relationships between addressed parties provided by one or more users, maintaining the database by further processing later received correspondence, and utilizing the database of relationships to provide relationship information between at least one of said users and the addressed parties.

A unique identification may be associated with each piece of correspondence and used to detect duplications of correspondence in order to more accurately determine a frequency of communication between addressed parties. The database may be maintained on a web based database of relationships in which addressed parties from a plurality of users are combined. Directly and indirectly addressed parties may be processed in correspondence to develop the database of relationships.

Connection paths between each of said users and at least some of the addressed parties may be displayed and additional addressed parties may be displayed upon selection of certain displayed addressed parties. Intermediate addressed parties, if any, between users and a selected addressed party may be visually displayed and/or prioritized together with the frequency of correspondence as well as the most recent correspondence between at least some of said addressed parties. The connection paths may be displayed, and/or prioritized in accordance with the closest, most recent, most frequent or some combination of recency, frequency and proximity of the correspondence between users and a selected addressed party.

Incoming correspondence may be sorted in accordance with the number of intermediate contacts, if any, identified in the database of relationships between users and the addressors of said incoming correspondence. Outgoing correspondence may be addressed to addressed parties in the database selected in accordance with the number of intermediate contacts, if any, between users and the addressed parties. Data related to the skills and experience of third parties may be processed to identify paths between users and third parties having selected skills and experience. Data related to the shopping experiences of third parties may be processed to identify paths between users and third parties having selected shopping experiences. The database of relationships may be analyzed in accordance with statistic norms to determine any deviations from such statistical norms of the correspondence pattern of selected addressed parties.

In another aspect, a method for deriving qualitative information related to addressed parties on correspondence such as emails includes processing a set of correspondence to develop a database of relationships between addressed parties, maintaining the database by further processing later received correspondence, and utilizing the database of relationships to determine patterns of correspondence for one or more of said addressed parties. Indirectly addressed parties on the correspondence may be processed to develop the database of relationships between directly and indirectly addressed parties.

Unique identification numbers may be associated with each piece of correspondence and used to detect duplications of correspondence in order to more accurately determine a frequency of communication between said addressed parties. The database of relationships may be maintained on a network, such as the web, in which addressed parties from more than one user may be combined. The frequency of correspondence, and the most recent correspondence, in the database of relationships between addressed parties may be determined. Normal patterns of correspondence between addressed parties may be derived to determine patterns of correspondence for a selected addressed party is consistent with the derived normal patterns.

In a still further aspect, a method for developing contact information from a user's correspondence such as emails, includes processing a collection of the user's correspondence to develop a database of relationships between said user and parties directly and indirectly addressed in said correspondence, maintaining the database by further processing later received correspondence, and utilizing the database of relationships to provide relationship information between the user and the addressed parties. A unique identification may be associated with each piece of correspondence and used to detect duplications of correspondence before maintaining the database in order to more accurately determine a frequency of communication between the user and the addressed parties. The database may be maintained on a web based database of relationships in which addressed parties from other sources may be combined. Connection paths between the user and at least some of the addressed parties may be displayed and additional addressed parties may also be displayed upon selection of certain displayed addressed parties.

Further displays may include intermediate addressed parties, if any, between the user and a selected addressed party, the frequency and most recent correspondence between the user and selected addressed parties while connection paths may be prioritized in accordance with the number of intermediate addressed parties, the most recent correspondence and/or the frequency of correspondence between said user and said pre-selected addressed party. Incoming correspondence may be sorted in accordance with the number of intermediate contacts while outgoing correspondence may be addressed to parties selected in accordance with the number of intermediate contacts.

Some implementations may relate to search results being filtered, displayed, and/or prioritized in accordance with contact information derived from correspondence information including address paths, such as emails.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

Figure 22:
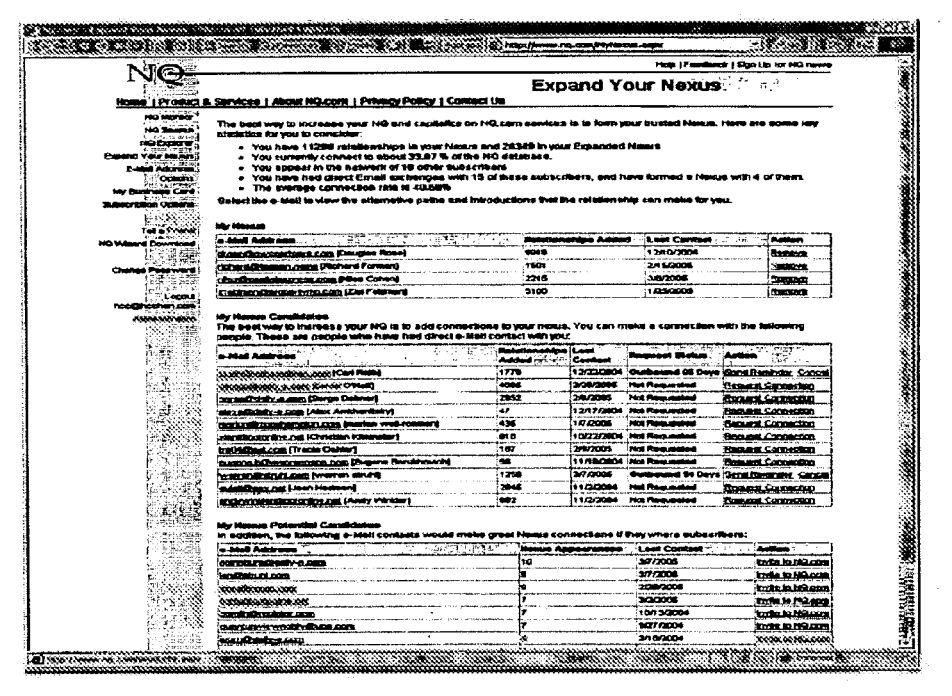

FIGS. 15 through 22 are screen shots from an implementation of product illuminating some of the methods and techniques of the previous disclosure, in accordance with one or more implementations.

DETAILED DESCRIPTION

Figure 1:
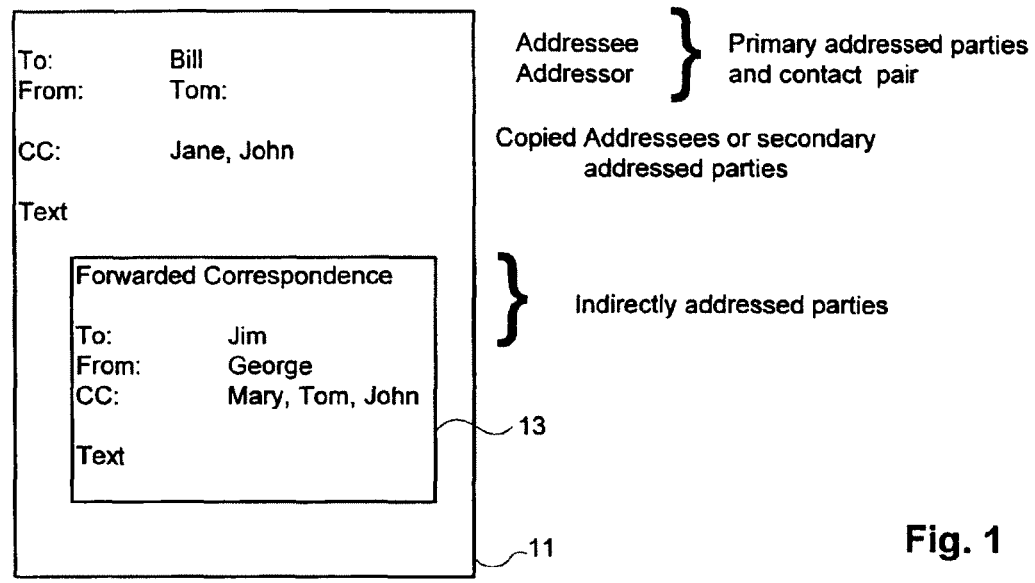
FIG. 1 is an illustration of a correspondence document including primary and secondary directly addressed parties as well as a forwarded document including a series of parties indirectly addressed in the correspondence document, in accordance with one or more implementations.

Why the "small world phenomena" occurs in the first place we believe is a function of the following factors. The average person has a loose clique of friends and acquaintances that form based to a considerable extent upon happenstance, but strongly influenced by a number of less random factors such as an individuals job position and location, schools attended, schools children attend, financial status, hobbies, religious practices, commuting habits, stores frequented, participation in community activities, and the long list of other activities that comprise everyday life. The "circle of acquaintances" that make up these cliques appear typically to number from 200 to 400 individuals. Obviously there are exceptions to the rule, the recluse that knows only his mailman, or the town socialite who seems to know everyone, and the actual number depends on many circumstances. For convenience, an average number of 300 individuals in a circle of acquaintances will be used.

Almost by definition, the nature of these cliques causes many if not most of the members to share essentially the same acquaintances. Inevitably however, if an arbitrary member, let's call her Sally, carefully maps the relationships between all the people she socializes with, she will find that a small subset of her clique will know almost none of the other members except for those where Sally made the introduction. These friends that are members of Sally's clique solely by virtue of their relationship with Sally are usually strong links to other cliques and may be called "nexus contacts." There appear typically to be on the order of about 5 to 15 nexus contacts per clique, for this discussion, an average of 10 will be used. These nexus contacts, although linked to Sally's clique only by Sally, are typically strongly linked to one or more other cliques, also with about 300 individuals. These linked circles of acquaintances include multiple chains of acquaintances, as discussed above and may be used to identify potential contact paths between individual and may also be used to create actual contact paths, by for example referrals, between individuals.

The individuals within a clique are generally not randomly distributed throughout the general population, however, when we look at a similar size group of "linking" or "nexus" contacts, they are distributed throughout the general population in a surprisingly random pattern. Furthermore, when a small percentage of the population is represented, there is relatively little overlap in the membership between cliques that are connected by the nexus contacts. It is a consequence of this pattern of connection, that the number of individuals just a few handshakes away grows geometrically.

This geometric pattern of growth means, in the idealized case, that the average person is only six introductions away from over 300 million people. The idealized case assumes an average clique size of 300, each with 10 nexus individuals and no overlap in member constituents between cliques. The bottom line, if you are looking for an introduction to a specific person, there is a very good chance that they are within a few degrees of separation from you. The degrees of separation between two people in this context means the number of intermediary contacts needed to perform an introduction. For example, if Joe knows Sally and wants an introduction to Mary, one of Sally's friends, the degree of separation between Joe and Mary is one degree of separation because one intermediary, Sally, would be required to make an introduction or provide a referral between Joe and Mary.

A technique is disclosed for determining which introductions you need to get to a person you are trying to reach, using information related to addressed parties derived from correspondence, using emails as an example. A personal and private relationship tree is derived from a database of relationships which may be derived from some or all of the addresses of addressed parties included in emails sent or forwarded to you, and then, in a clear and actionable format, the possible contact paths, or paths of introduction, to the person you are trying to reach may be displayed and used. The technique need not be limited to email communication and is applicable for other types of correspondence where a record of the communicating parties may be made available electronically. Examples include phone records, as from telephone bills, instant messaging logs, or similar compendiums of contact data.

The term "Relationship Finder" refers to the techniques for automatically building a personal and private relationship tree and the tools to access this information.

The terms "Nexus Quotient" (or NQ) and "Estimated Nexus Quotient" (or ENQ) refer to two methods of providing a normalized measure of the extent of an individual's connections as evidenced by his or her communications history.

The term "World View" refers to an online subscription service that can be used to expand the reach of a user's database by enabling password protected access to the relationship trees of other subscribers in one or more predefined groups.

The term "Skills Registry" refers to an online service where individuals record their education, expertise, skills and experience, enabling users to search their relationship trees for introductions to people with specific qualifications.

The term "Referral Marketing Toolkit" refers to techniques allowing users to market products to their relationship tree through qualified referrals from people they know.

The term "SpamGate" refers to techniques for using knowledge of the addresses in a user's relationship tree to intelligently filter out unwanted bulk email solicitations, while insuring that all the messages they want get through.

The term "email scoring service" refers to a service that scores an email address based upon its observed frequency and pattern of communication as compared to some statistical norm. One of the possible uses for the email scoring service is to provide a predictive assessment of the likelihood that a particular address is being used for valid commerce versus dishonest use. That is, an email address may be scored to indicate that it has been involved in a normal pattern of communications for a reasonable length of time or it may be scored to indicate that it has been used in a pattern of communication, such as only for outward bound mailings, that is not indicative of a normal email address for an individual. This information may be arrived at without regard to the identity of the email address holder and without regard to any specific individuals with whom communication has taken place.

Referral endorsement services refers to a service that can be integrated with retail commerce websites, auction websites, and other public websites with the purpose of providing website visitors a means to obtain website specific endorsements and or references from individuals they know or can reach indirectly.

The Email Relationship Finder may be provided as a "stand alone" software product or as a "plug-in" to Microsoft Outlook® and Outlook Express® or other email clients and may run on Microsoft Windows® 95, 98, 2000, NT and XP or other operating systems. In other implementations, the Email Relationship Finder may work directly (either client-side or server-side) with POP3, MAPI, IMAP, and Hotmail or similar compliant online email account protocols.

The Email Relationship Finder may be used for extracting email or addressed party relationship pair information and also may serve as a user interface to the other services. The discovery of additional email stores, and the selection of logical locations to search for additional valid addresses, may be valuable steps in expanding the breadth and depth of a database of relationships. For instance, consider that in Microsoft Outlook, it would not be prudent to search the "inbox" or "deleted" folders since they will invariably contain "spam" from people with whom the user has no relationship. In an alternate implementation, it is possible to optionally maintain separate lists to process, each with multiple folders to search, in the event users wish to maintain separate relationship trees, such as business, personal, school, etc. A given folder may reside on multiple lists. In still another implementation, discovery and/or selection of folders may happen automatically and all emails could be analyzed without concern of pre-selection. In this implementation, global information related to spam characteristics may optionally be employed to eliminate those communications from analysis.

Extraction, or parsing, of email addresses from all email headers and positional recognition of email addresses in text files, such as may be found in forwarded attachments, is an important step in the process. Extraction may be limited to the directly and indirectly addressed parties by for example extracting addresses following the "From:," "To:," and "Cc:" markers on the email correspondence being processed and as well as on forwarded emails attached thereto. The extraction process may optionally also extract secondary information, when present, related for example to the direction of the correspondence by extracting the email text labels attached to the email address and the date of communication (either sent date or received date). The email internet ID may also be extracted for use in preventing duplicate emails from being parsed.

The process may provide the automatic building and maintenance of databases of relationships, such as relationship tree databases, on a logical local drive that may optionally be user selectable, from all extracted email addresses and "screen names" automatically as part of the extraction/parsing functionality. In an alternate implementation, separate relationship trees may be maintained matching the separate lists of grouped folders processed.

The user may have control over and may maintain preferences for his relationship tree with respect to database sharing and privacy in conjunction with the online services. In the alternate implementation, the user may have control over, and may maintain preferences separately, for each relationship tree.

One or more optional implementations may provide the user the ability to:
1) Maintain of a list of alternative (alias) email addresses that the user uses. All link searches may begin by default with these addresses.
2) Maintain lists of alias email addresses for their contacts so that all alias addresses may be automatically known to be the same contact when performing searches.
3) Maintain a global list, and individual lists, of email addresses to exclude from the relationship tree databases.

The data stored in the relationship tree databases may contain additional or secondary information, but for each instance of every email address pair extracted, on or more of the following information typically may be collected and/or stored:
1) The email addresses forming each "end" of the email pair.
2) The latest email communication date.
3) A pointer linking the email addresses that defines the contact pair relationship and direction of communication and the frequency of communication between the two addresses.

A unique original email ID# to prevent duplicate processing. This is collected for each message processed, not each pair.

In alternate implementations, the relationship database may be cross referenced to other local, public, or private third party databases that are indexed by email address and contain relevant information that may be of interest either as a search term or a search result.

One or more of the following reporting options may also be made available:
1) Ability to list all email addresses alphabetically by the degree of separation or visa versa.
2) Ability to export email addresses to spreadsheets, with degrees of separation, or address books, with the category coded to show the source relationship tree name and degree of separation.
3) Ability to choose target email addresses with a list of alternates because many people have several email addresses.
4) Ability to maintain several lists, which the user can select or deselect, of email addresses to exclude from email chains.
5) Ability to choose up to how many degrees of separation to report.
6) Ability to change default maximum number of linkages to show.
7) Ability to choose date range to include based upon email received date.
8) Ability to list which email relationship trees to run search on.
9) Ability to override the default origin address and input a separate address to view chains between other individuals.

Report Display options may include one or more of:
1) View on screen a text based report of results.
2) View on screen a graphic report or display of results.
3) Write to word processing file.
4) Write to spreadsheet file (by degree of separation and for $1^{st}$ degree or greater showing link addresses in successive columns).
5) Display/Hide date of email.

The World View may be available by subscription that allows users to share selected personal relationship tree databases via a centralized online database and to gain access to a larger universe of email address paths than they have individually. Access to the shared trees may be limited to the addresses on the direct path between addresses contained on the subscribers database and the target address. Therefore subscribers may only be shown email address information on paths that originated in their personal contact trees and end with the target address, i.e., the shared and personal relationship trees connect through a common email address. In other implementations, users that share access may have full view of each others' information.

Each user optionally may maintain a list of email addresses that are to be excluded from the shared tree. Any time excluded addresses are encountered, those addresses, and any down-line addresses in those chains, may not transferred to the online database.

The Skills Registry may consist of two web based components that together allow introduction paths to people to be determined based upon the "target's" qualifications rather than knowledge of their email address.

The first component of the Skills Registry is a web based registry that may allow any individual, whether or not they are users of the email relationship finder, to enroll in the service and record their education, expertise, skills and experience on a secure and restricted database. The enrollee can revisit the site at any time to update or modify their profile. The profile is compiled by selecting from an extensive list (with optional temporal qualifiers; such as when, how long) of job functions, job titles, company names, school degrees, schools attended, professional development programs, professional expertise, geographic information, family information, hobbies, interests, etc. Free form information may be the contact information, address, telephone, etc., and a non searchable file attachment, typically a resume, curriculum vitae, or portfolio. The amount of information provided is at the discretion of the enrollee. The enrollee must enter at least an email address. Each email address entered may receive a coded reply that may require a separate response before it is authorized in order to insure the validity of the address and its owner information. The enrollee may also enter the maximum distance in degrees of separation that a inquirer can be from the enrollee in order to have access to this information. The Profile information is used to generate search results. The free form information, if any, is provided to inquirers that find the enrollee as a result of a profile search. In either case, the information can be restricted so that it is only accessible to inquirers within the distance defined by the enrollee. As an incentive to enroll in the registry, registry users may be offered the option of learning their Estimated Nexus Quotient (ENQ) which is based largely upon the frequency and position that their email address appears in the global database of all users.

The second component allows World View users to search their relationship trees for introductions to people with specific qualifications.

The Referral Marketing Toolkit© allows users to market Email Relationship Finder and other select products. Once the software is installed, a popup window may periodically present an offer to promote the Email Relationship Finder product, and selected other tools, to all zero and one degree of separation email addresses, i.e., those addresses that have had direct contact with the user and need no intermediary introduction or need only one intermediary introduction. The offer may provide some form of compensation, such as cash for each unit sold to the first degree address holder, or as a prize based upon the most units sold by referral, or with earned MLM points that are good to redeem products. When a purchaser is referred by more than one source or more than one time, each referrer that provided the introduction prior to the purchase fractionally shares the credit. A "multi-level marketing" or MLM version of this promotion plan allows credit to be awarded for "down line" sales as well.

If a user agrees to participate in the promotion, then the user can choose from a short list of pre-scripted promotional letters where a portion is user editable. The letter is from the registered user's email address and each copy is individually addressed to all zero and one degree email addresses in the users contact tree. When the user sends out promotions, the zero degree and one contact list is sent to a mail server that handles the outbound mailing for the user avoiding ISP bulk mail restriction issues, and at the same time, this facilitates tracking of referrals for reward purposes. Each promotion has a unique identifier and the list server will only send the first 3 of a given promotion to an individual. This avoids over mailing popular promotions from a large number of users. If the user does not participate in the promotion, they are asked again periodically. An option to turn off this prompting is available.

From time to time, active users may be offered to promote selected products using the same method and with various compensation or prizes.

Extended functionality may be available in which a special email composition tool may be provided for the user to market their own products.

Other implementations of the referral marketing program may allow users to check off product types that they have interest in. When a user sends other users promotional letters, even through non-user intermediaries, they only go to those users that have interest in the types of products being marketed.

SpamGate is a spam filtering tool that in one implementation may operate as follows:

1) SpamGate installation may add "quarantine" folders to the user's email client, such as: Inbox_Filtered; Inbox_FollowUP; Deleted_Spam; and Saved_By_Name. In addition, a toolbar may be added with selections such as Delete Content, Delete Email Address, Undelete, File As, Follow Up, and/or Auto File buttons.

2) When SpamGate is active, emails that arrive go through a "vetting" process to filter the incoming messages. The user first decides how many degrees of separation on their relationship tree to use when matching incoming email addresses with relationship tree addresses. The assumption is that spam will not be coming from email addresses that are part of acceptable correspondence. When a "From:" email address matches a relationship tree address, the email goes into a special inbox-filtered folder otherwise it goes to the normal inbox.

In one implementation, as the users view email in their normal inbox, they have several options:

1) They can move the email to a folder set to process addresses into a relationship tree and therefore add the addresses to a vetted list.

2) They can move the email to a folder set only to add the addresses to a vetted list but not process addresses into a relationship tree.

3) They can move the emails to a folder set to not do anything or use the normal delete key and the addresses will be added to none of the lists.

4) They can use the Delete Email address button and the address will be moved to a list where all future emails from that address will be deleted automatically. In the event that the address already exists in the user's relationship tree, the user is asked if that address should be deleted from the tree as well. If the answer is yes, then those address occurrences and all their down-line chains are removed as well.

5) They can use the Delete Content button and whenever the same content of the message arrives, regardless of the sender, the message will be deleted automatically. A formula converts each message to a unique number to accomplish the required matching. After the Delete Content key is pressed, the email does not move until either the normal delete key or the Delete Email address key is pressed (allowing the content and address to be placed on automatic delete lists as well, if desired).

6) They can use the Follow Up button and the email will be moved to the "Inbox_FollowUp" folder. A popup window asks when to follow up. When the follow up date and time is reached, if the email is still in the folder, it is automatically forwarded, from screen name Follow_Up, to the Inbox_filtered folder using the then current date and time and it is marked as unread.

7) They can use the File As button and the email will be moved to a subfolder of the Saved_By_Name folder. A popup window asks to name the subfolder as either the sender's email address, the sender's screen name, or some other name that the user specifies. If the user had previously processed an email from the same sender email address using the File As button, then the popup window does not appear and the email is simply moved to the same folder as the prior time.

8) Finally, the user could use the Auto File button and a popup window would ask which folder to automatically file this and all future emails from this address upon arrival. The user is also offered to create a new folder if the appropriate one does not already exist.

Emails that are deleted in step 4 or 5, or as a result of being placed on a list by steps 4 or 5, may be moved into the Deleted_Spam folder. Going to that folder and using the new Undelete key moves the message to the normal inbox and removes the email address or content from the always delete lists, but this may not return deleted email addresses to the relationship tree.

The techniques disclosed may provide the following advantages in one or more implementations:

1) Parsing nested email addresses into a social network relationship tree that captures and preserves the multiple levels and interconnections, of email address relationships within a users private email corpus.

2) Use of the data in a social network relationship tree to determine and report the multiple paths of introduction to targeted individuals.

3) Sharing of personal social network relationship tree with others in order to expand the extent of contacts, i.e., the method of creating an extended social network relationship tree.

4) Sharing of personal social network relationship tree with others without disclosing the contents of the relationship tree that are not on direct paths to the target.

5) Use of the personal social network relationship tree in the filtering of undesirable bulk email advertising such as spam.

6) Use of the social network relationship tree to market products to personal contacts, and to their contacts and again to their contacts.

7) The method of building a confidential skills profile compendium that provides access only to individuals that are within a certain "diameter" or "distance," from the individual whose skills are recorded, based upon the inquirers personal and extended social network relationship tree.

8) Use of the "all users" aggregate database to provide an "email scoring" service that identifies email addresses as having historical communications activities that are statistically typical of addresses used for certain purposes, such as fraudulent purposes.

9) Use of the user's relationship tree to find an individual known to the user directly, or through introduction, that has experience with a particular commerce activity at a participating website.

Referring now to FIG. 1, correspondence comes in many forms including printed correspondence delivered by post or forwarded by facsimile, email correspondence as well special purpose correspondence such as telephone bills. Document 11, for example, is a piece of correspondence sent by Tom, the addressor, to Bill, the addressee. Bill and Tom are the primary addressed parties and form a correspondence, or contact pair, at the ends of a contact or correspondence path from Tom to Bill. As shown in document 11, there may be other parties to the correspondence addressed at a different level, such as secondary addressees Jane and John, who are addressed directly in document 11 by being indicated to receive copies of document 11. In particular, Jane and John are each separate direct addressees at the end of a contact path from Tom although they have some level of connection as noted below.

Certain types of correspondence may also include addressed parties not directly addressed, that is indirectly addressed, in the current document. For example, document 11 may be a document forwarding a copy of other correspondence, such as document 13, which includes indirectly addressed parties Jim, George, Mary, Tom and John. Other types of correspondence, such as telephone bills, may include indirectly addressed parties in that information such as each identified telephone number called indicates at least one address form representing an addressed party even though the phone bill is not directed to any of these indirectly addressed parties. Each indirectly addressed party on a telephone bill may be on the end of a contact path from the phone bill's addressee while the primary or direct contact path is from the phone company to the billed addressee.

Figure 2:
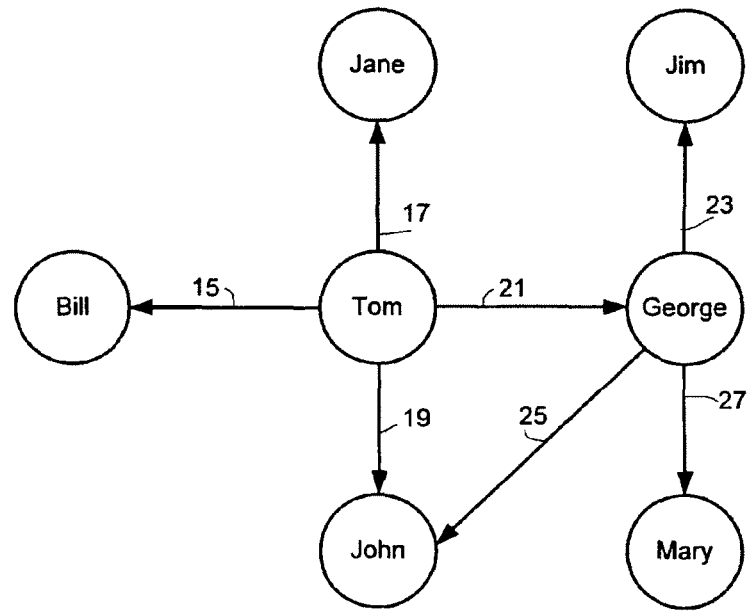
FIG. 2 is a visualization of the various contact paths, and some of the contact path secondary information related to contact path direction, of the document shown in FIG. 1, in accordance with one or more implementations.

Referring now to FIG. 2, each addressed party in a piece of correspondence may be said to have a relationship, such as a contact path, with the other directly addressed parties. For example, as shown, Bill and Tom may be said to be the ends of a contact pair as a result of document 11. This contact pair may be identified by contact path 15 from Tom, the addressor, to Bill, the addressee. The direction of the path may be indicated by the direction of the arrowhead or other means on contact path 15. Further, Jane and John are each at the end of a contact path from Tom shown as contact paths 17 and 19, respectively.

Contact paths, in addition to having at least a pair of addressed parties, also at least potentially include additional or secondary information, such as the direction of flow of the correspondence and/or whether or not the parties were directly or indirectly addressed in the document being considered, such as document 11. Additionally this information could include all the dates of communication, pointers identifying the specific communication or the source of communication or any other meaningful information that can be extracted from the original source data. For convenience, contact paths 15, 17, 19, 21, 23, 25 and 27 are shown with arrowheads to indicate the direction of contact In summary, contact paths between addressed parties may therefore include secondary information such as the direction of correspondence as well as the addressed pair of parties. Depending on the intended usage, data collected with regard to addressed parties may include such secondary information for some types of contact paths and may not include such secondary information for other types of contact paths.

Figure 3:
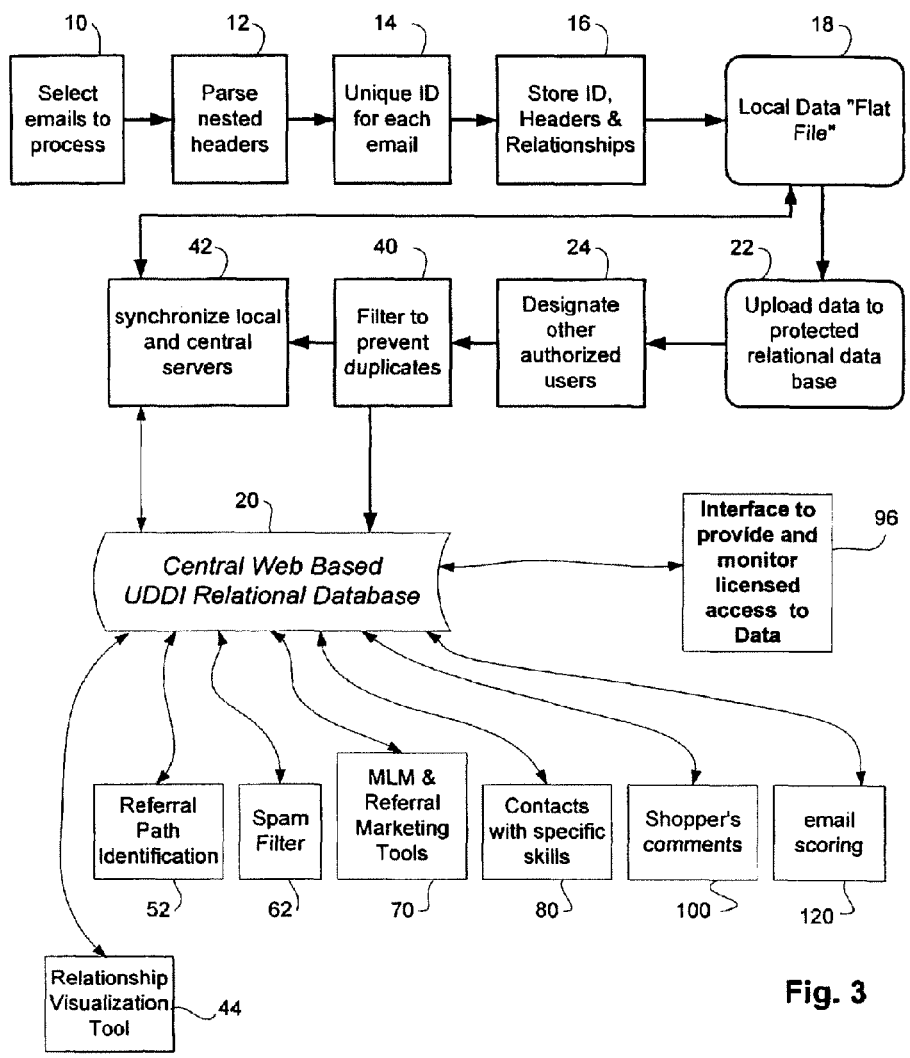
FIG. 3 is a top level, block diagram flow chart of the operation of the overall technique disclosed for creating and using a database of contacts collected from email records, in accordance with one or more implementations.

Referring now to FIG. 3, the process will be described in terms of steps taken with regard to a first user, User A, to develop a local data file, and/or the combination of that data with data from a similar user, such User B not shown, to create a web relational data base or database of relationships, followed by descriptions of a series of services or tools that may interact with the database of relationships.

Beginning with User A, step 10 operates to choose a group of email records to process. In step 12, record headers or equivalent text are parsed, including those in nested or forwarded email messages, in order to retrieve email addresses for all addressed parties along with From:, To: and Cc: relationships for each address. Thereafter, in step 14, data may be extracted, or an algorithm may be applied to each email and attachments, that provides a unique numeric result for each email processed as a unique source ID. In step 16, data may be written to a data store such as a local hard drive, for example as a relational or flat file 18, to temporarily store the extracted email headers and relationship information as well as the unique source ID.

Some of the functions may then be performed locally for User A based on data collected in flat file 18, but substantial advantages can be achieved by subsequent processing to create a Internet based relational database such as central web based UDDI relational data base 20. A UDDI, or Universal Discover, Description and Integration database, is a standards based XML database with restricted or controlled access to the data. In particular, in step 22, data is uploaded to a central web based relational database 20 which is protected by user ID and password available only to the user. In step 24, the user may optionally designate other users that have permission to access the owner's data.

The data to be written to relational data base 20 may then be processed by server side database pre-processing operations in step 40 with filters that prevent duplicates and process only incremental data from the flat file. Step 40 may also key data to the user providing that data so it is only accessible by authorized users which may have been designated in step 24. Step 40, in addition to uploading the preprocessed data to relational database 20, may also cause the writing back of data to local files, such as data file 18, to facilitate further processing by reducing need to reprocess previously processed data.

Once the relevant data has been uploaded to relational database 20, which may conveniently be accessible to a group of users by for example being located on a central server in a local network or preferably in a wide area network such as the Internet, various processes or tools may be used to work with this data.

Figure 4:
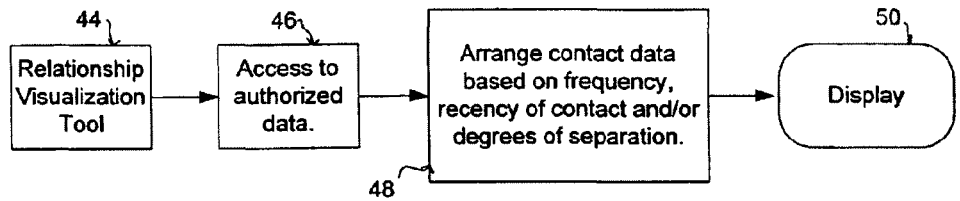
FIG. 4 is a block level flow chart of the relationship visualization aspects of the technique, in accordance with one or more implementations.
Figure 5:
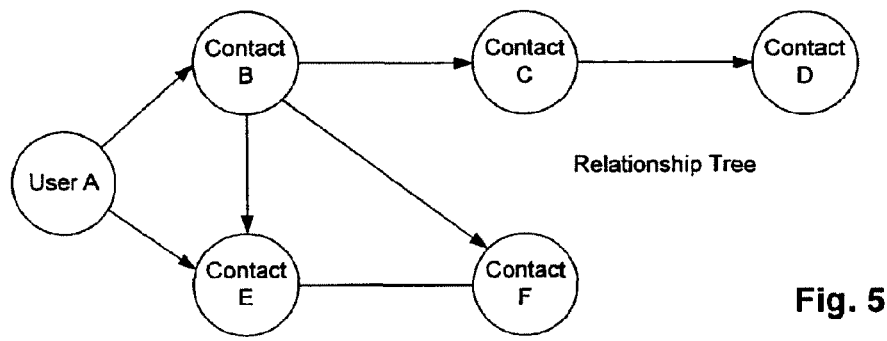
FIG. 5 is a display of a relationship tree illustrating the contacts for User A, in accordance with one or more implementations.

Referring now in more detail also to FIGS. 4 and 5, relationship visualization tool 44 may provide visualization by display for the user of contact relationship data in central database 20 by loading the data in step 46 that the user is authorized to access. In step 48, data points representing contacts or addressed parties may be arranged to identify the most frequent links. Color codes, based upon recency of contact and/or degrees of separation, may be assigned. The spatially arranged and color coded results may then be displayed on display monitor 50. The results displayed on monitor 50 may represent the relationships, and paths there between, beginning with the user and extending through all contacts, or addressed parties, disclosed in the emails, or other source of data, processed by the steps disclosed and may be referred to herein as a relationship tree which shows the direct and indirect relationships of a user.

As shown in FIG. 5, the data visualized from database 20 may show, for example, that User A has direct relationships, at least with regard to one or more existing emails, with Contacts B and E, while Contact B has additional direct relationships with Contacts C and F while Contact C has a direct relationship with Contact D and Contact E has a direct relationship with Contact F. Although a typical useful visualization display of this type may be much more complicated than as shown in FIG. 5, it is apparent that User A may much more easily comprehend that he can make contact with Contact D via Contacts B and C by viewing the visualization in FIG. 5 than be reading the above provided text.

Figure 6:
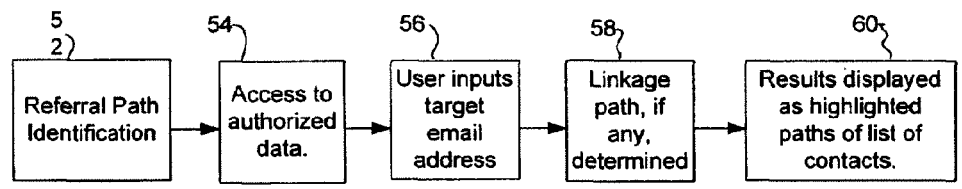
FIG. 6 is a block level flow chart of the referral path identification aspects of the technique, in accordance with one or more implementations.
Figure 7:
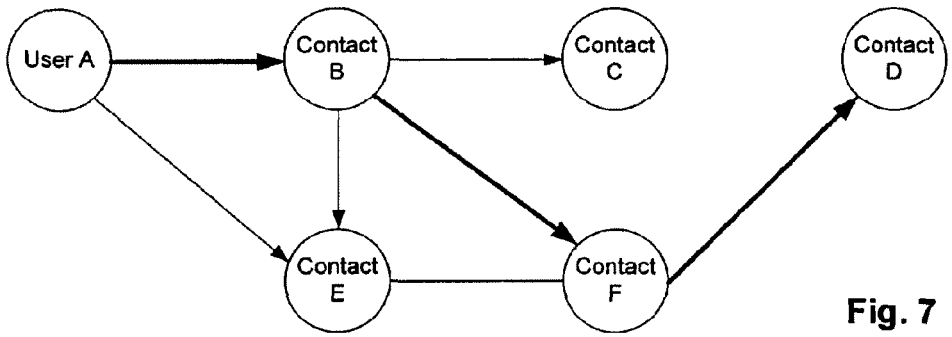
FIG. 7 is a display of a selected referral path in the relationship tree of FIG. 5, in accordance with one or more implementations.
Figure 8:
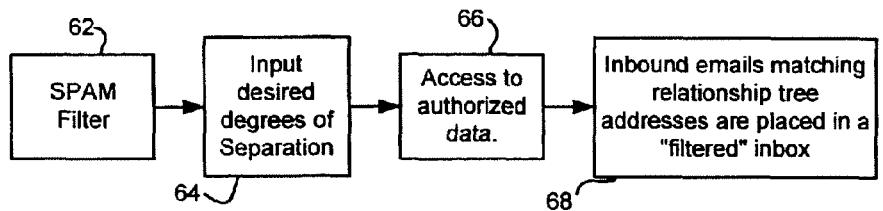
FIG. 8 is a block level flow chart of the SPAM filter, in accordance with one or more implementations.

Referring now in greater detail to FIGS. 6 and 7, referral path identification 52 operates on the data, in step 54, by loading data that the user is authorized to access. The user may then input target email address(es), or any other valid search criteria such as that available from directories cross referenced to email addresses, in step 56. The data and email address(es) may then be processed in step 58 using a breadth-wise incremental search to determine linkage paths which are then used to create display 60 in which the results may be displayed as highlighted paths or list of contacts.

As shown in FIG. 7, the closest path between User A and Contact D, the inputted email address, is shown as the highlighted path via Contacts B and F. It should be noted that a similar length path happens to exist via Contacts E and F, but is not shown as highlighted. The selection of the path via Contacts B and F may be made automatically in processing step 58 on the basis of the most recent contacts made along this path of parts of it, on the basis of the number of contacts made along this path of parts of it and preferably upon a combination of both the above described recency and frequency criteria.

Spam filter 62 may operate upon data provided by the user in step 64 indicating the degrees of freedom or separation, the to use as a filter on the data loaded in step 66. A single degree of freedom or a single step of separation refers to a direct contact, such as the relationship between User A and Contact B in FIG. 5. A second degree of freedom, or two steps of separation, refers to the indirect relationship between User A and Contacts C and D in FIG. 5.

In step 68, inbound emails with origination addresses that match relationship tree addresses in accordance with the degrees of freedom data provided in step 64 are placed in a filtered inbox. Inbound emails with origination addresses not matching addresses on the relationship tree may be left in the general inbox for review or may be further filtered based on other criteria to evaluate the likelihood that they are undesired emails such as SPAM.

Figure 9:
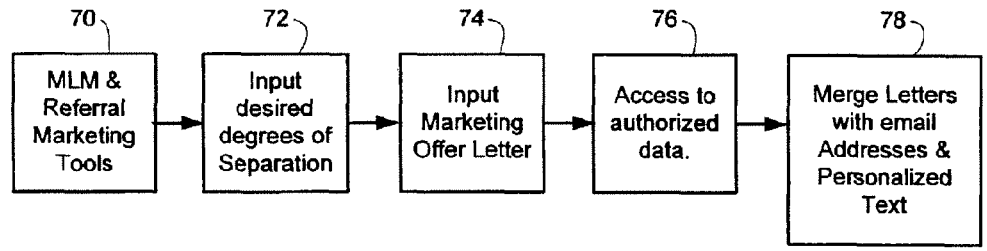
FIG. 9 is a block level flow chart of the marketing tools aspects of the technique, in accordance with one or more implementations.

As shown in FIG. 9, multilevel marketing (MLM) & referral marketing step 70 combines the degrees of separation selection provided by the user in step 72, and a marketing offer or other letter provided by the user in step 74, with data loaded in step 76 to personalize each letter with the referrer's email address in merge program 78.

Figure 10:
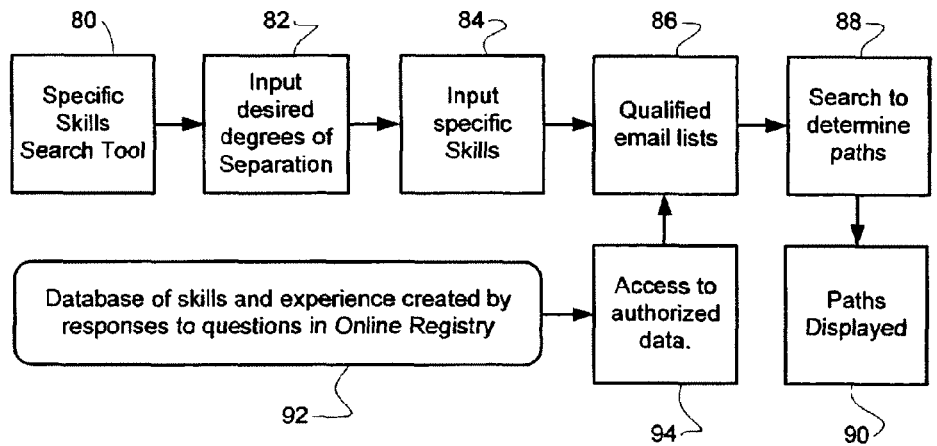
FIG. 10 is a block level flow chart of the skill and experience based path selection aspects of the technique, in accordance with one or more implementations.

Referring now to FIG. 10, skill registry tool 80 may be used to obtain introductions to individuals with specific skills. The user provides a selected degree of separation in step 82 together with data related to the desired skill set, and/or experience, in step 84 which are compared with the relationship tree lists to form a qualified email list 86. List 86 may be further processed in step 88 with a breadth-wise incremental search to determine linkage paths for creating display 90 which may display results as highlighted paths or list of contacts. Other directories may be cross referenced to provide expanded search capabilities.

Additionally online registry 92 may be made available for individuals to post answers to detailed questions about their skills and experience while providing an email address. Data from online registry 92 may then be loaded from database 20 in step 94 and added for processing in list 86 to further qualify the email lists.

Figure 11:
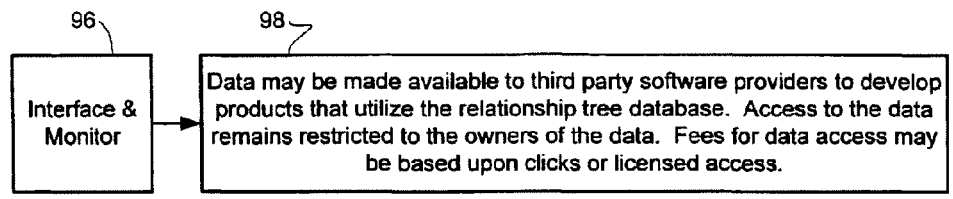
FIG. 11 is a block level flow chart of the interface with third party software developers, in accordance with one or more implementations.

Referring now to FIG. 11, interface 96 may be used to provide and monitor licensed access to data in step 98 in which data is made available to third party software providers who can develop products that utilize the relationship tree database. Access to the data remains restricted to the owners of the data.

Figure 12:
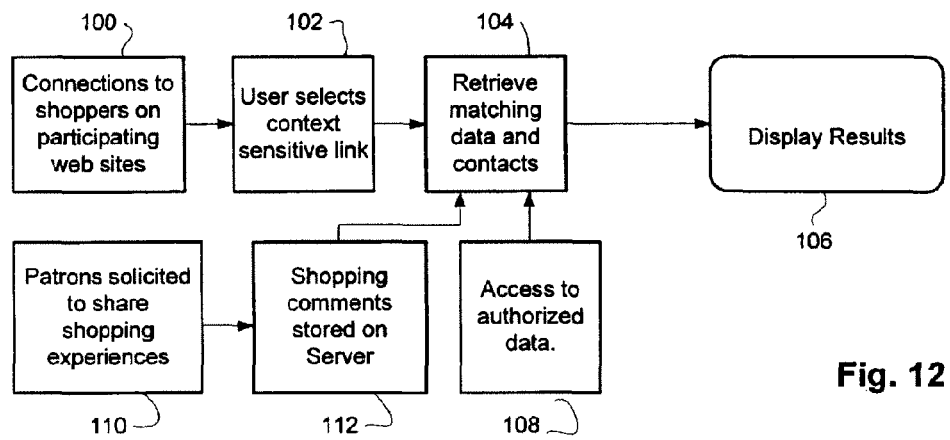
FIG. 12 is a block level flow chart of the shopper connection aspects, in accordance with one or more implementations.

Referring now to FIG. 12, interface 100 may be used to provide a user with a reference from an individual known to the user regarding commerce activities at a participating website. Typically a context sensitive link 102 allows the user to expose their relationship tree 108, and the website to expose a visitor history file 112 from patrons who have elected to participate at 110. The data is then matched for relevance in step 104 and then filtered data is made available to the user in step 246, where a list of potential endorsers is made known, possible with their posted comments.

Figure 13:
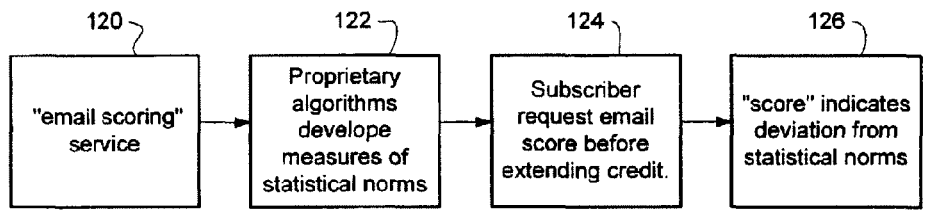
FIG. 13 is a block level flow chart of the mail scoring service aspects, in accordance with one or more implementations.

Referring now to FIG. 13, interface 120 may be used to provide credit issuers (or credit card sales retailers) an additional means of evaluating the credit worthiness of a particular transaction. Proprietary algorithms are employed at 122 to periodically review the pattern of connections of all email addresses in the database. This is performed on communication link history from all relationship trees without regard to the owners of the information. The algorithm assigns a "score" that indicates a deviation from "normal" usage. Authorized subscribers can make inquiries at 124 that reveal the "score" at 126. Authorized subscribers use this information along with other information they already have to help them in their decision regarding the validity of the transaction.

Figure 14:
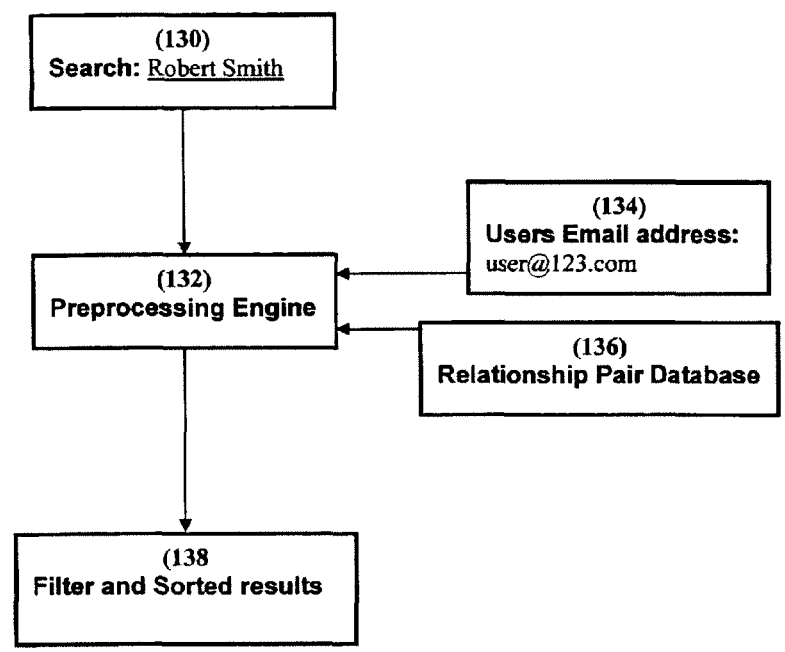
FIG. 14 is a flow chart showing the operation of a search in which the results are filtered in accordance with contact information, in accordance with one or more implementations.
Figure 15:
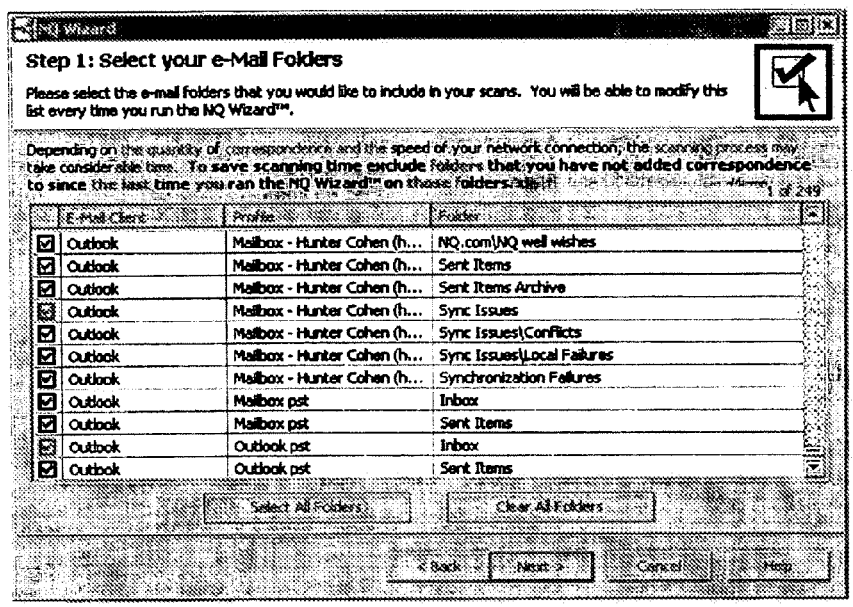
Figure 16:
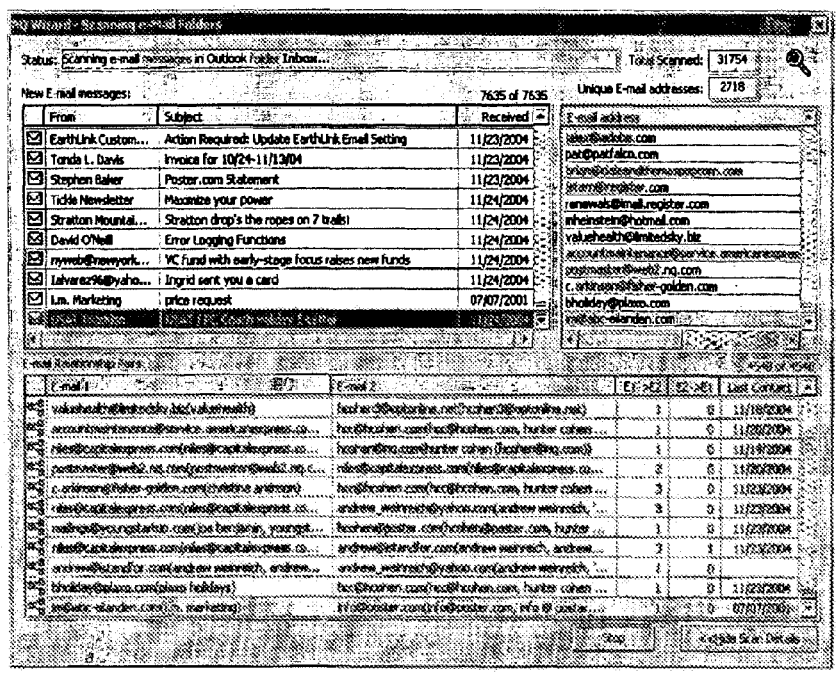
Figure 17:
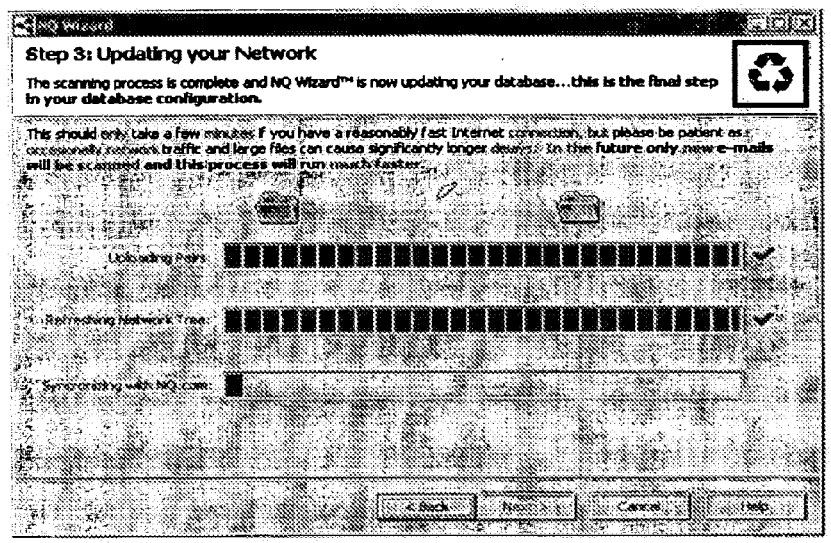
Figure 18:
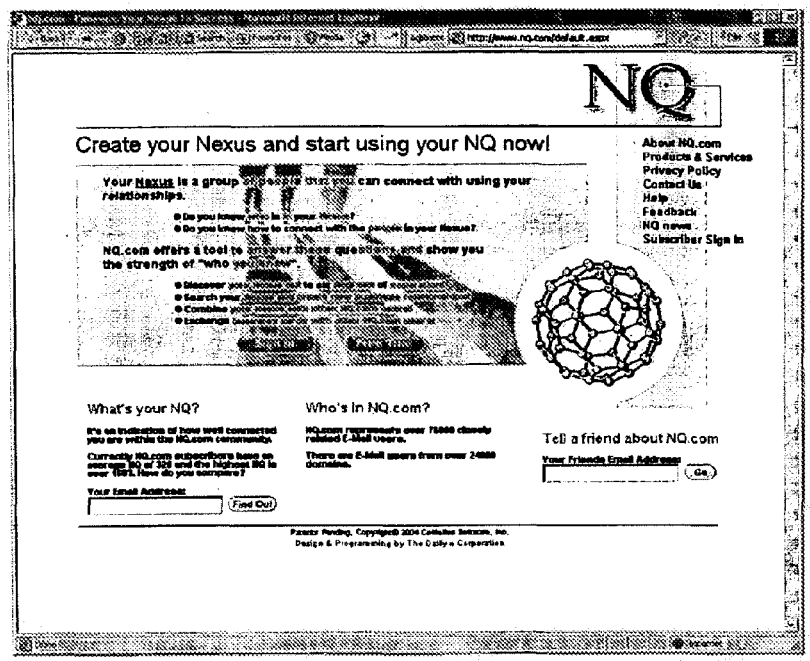
Figure 19:
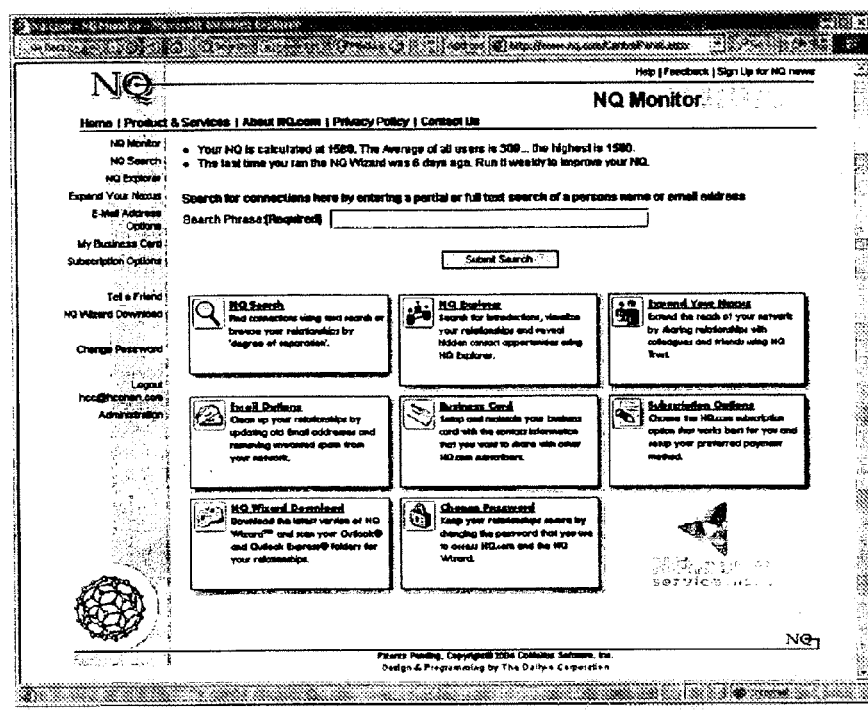
Figure 20:
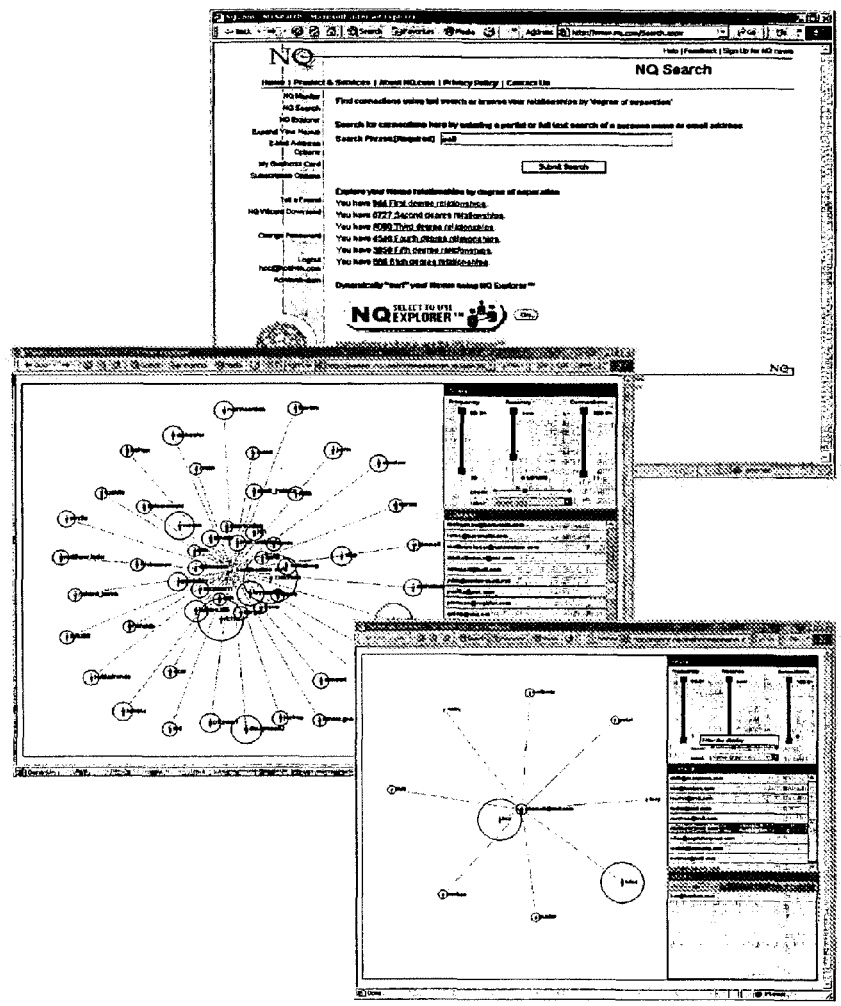
Figure 21:
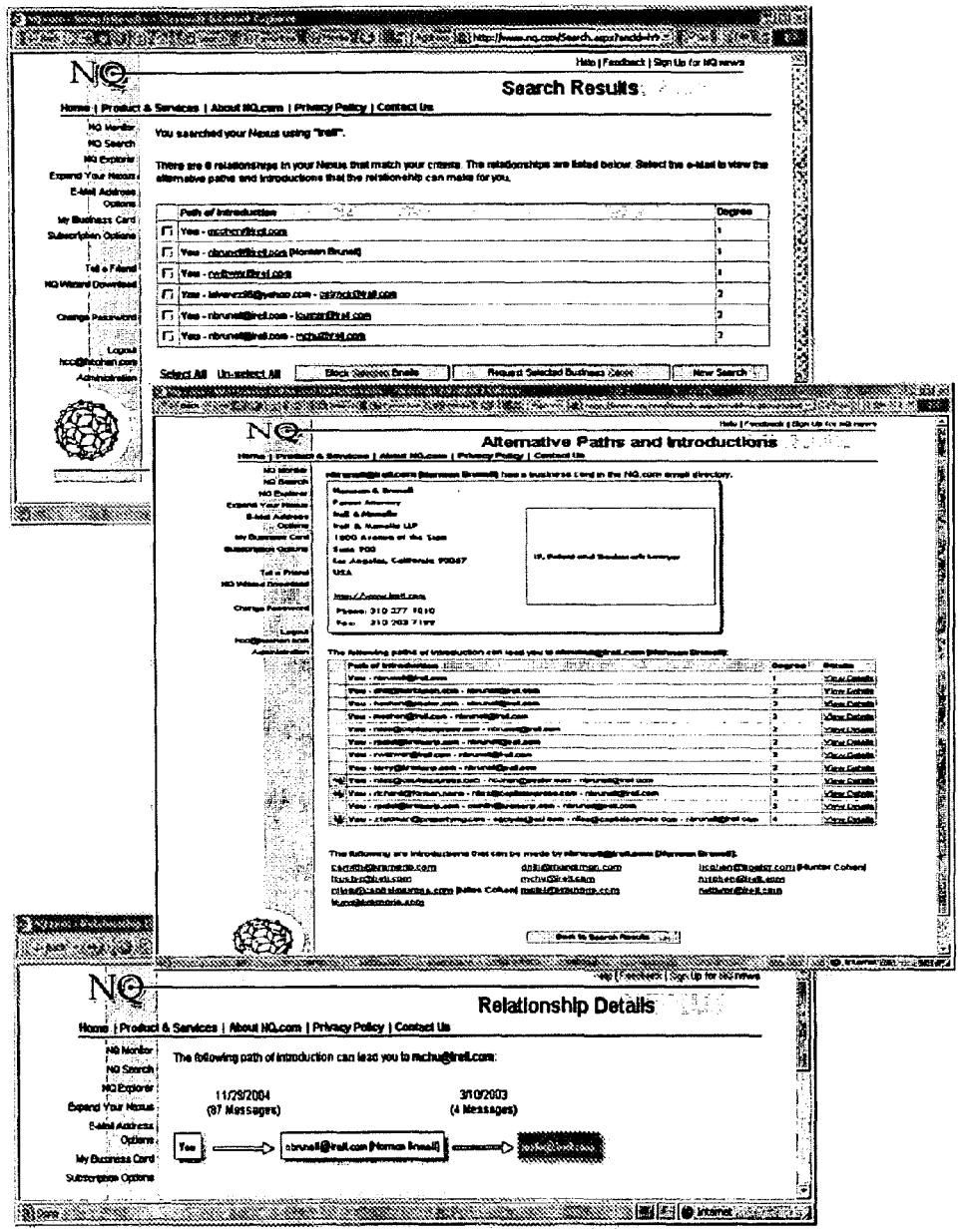

Referring now to FIG. 14, search results may be sorted, filtered and displayed based on their relevance to the user's network of contacts. The incredibly large and rapidly growing volume of diverse information that is archived and accessible on the internet today has spawned a number of "user friendly" search tools that in a short time have found almost ubiquitous use and acceptance. The methods that these search tools use to search (find matching target records), filter (exclude uninteresting target records) and sort (present target records to the user in an ordered list) are widely varied and are often proprietary. Filtering and sorting search results may be based upon the target record's "proximity" to the searcher (user) as evaluated based upon the searchers "social network of contacts," that is, based on the number of connections as shown in a database of prior connections needed to connect the user to the target.

As shown above, a source database that can be utilized to provide "contact paths and proximity" between source and target individuals, but the actual source of such information need not be limited to any particular collection method. A number of methods for building the database immediately come to mind and may be used, including cellular phone call logs, internet messaging, communication logs, social networking website databases (linkedin.com, Friendster.com, MySpace.com), contact list server provider databases (Plaxo.com, GoodContacts.com), and other social contact website databases (Classmates.com, eVite.com and BirthdayAlarm.com). A number of sources may be combined to increase the size and validity of the relationship pair data, with the primary consideration for the data source being that it represents direct communication between uniquely defined individuals.

Once a large data base of "relationship pairs" is assembled, "least cost" paths from source to target individuals. These "least cost" paths may be as simple as finding the shortest chain between source and the target or may incorporate and variably weight additional known factors such as recency of communication, frequency of communication and relative geographic location between each participant pair in the chain. The information evaluated for each search target record is then used to filter and sort search results so as to provide the user with results most relevant to their social network (or in closest proximity) listed first. The term social network is intended to include those entities addressed directly or indirectly in a database of the user's correspondence or other connections.

A user may visits website 130 that provides telephone directory information and enter a search for a common name such as Robert Smith. Instead of directly presenting the long undifferentiated list of results to the user, the website may first filter or pre-processes the list on separate analysis engine 132 that utilizes the searcher's email address 134 along with the large relationship pair database 136 to provide search results 138 which are filtered and sorted to present only those instances of Robert Smith in the search 138 that appear in the user's social network. If multiple instances of Robert Smith appear in the user's social network, search results 138 may be presented in an order that lists the instances that have the closest "weighted" relationships first.

Referring now to FIGS. 15 through 22, a potential product is described to further illuminate the disclosed methods and techniques.

Everybody has heard the old adage "It's Not What You Know, It's Who You Know," and most people believe that it has at least some truth to it. The problem is that, except for the small circle of very close contacts, most people have almost no idea about who the people they know, know, and they therefore have a low "NQ™" (i.e., Nexus Quotient™ . . . the measure of how well connected you are to others).

NQ.com provides enabling technology that discovers chains of contacts and "connects-us" to individuals through analysis of our email communications. The software builds "personal relationship trees" that display the extent, frequency, and recency of the social network relationships that you, and your contacts, have with others. This mapping of your "Nexus" introduces a new level of importance and truth to the saying "It's who you know" by expanding the reach and value of social networks into an amazing array of activities.

NQ.com raises your NQ by both making you aware of contacts you already have, and by providing a tool for you to identify and build new contacts through the people you know. Furthermore, through relationships with participating websites, NQ.com immediately leverages the value of your personal Nexus by enabling participating website searches to consider and display your "social connection" when returning search results.

The value of social networks may be greatly underestimated and underutilized. Given the proper tools, social networks may be used to: gain new client introductions, solicit charitable donations, find a Job, predict buying trends, find a date, help in hiring decisions, filter spam email, identify on-line credit card fraud, market new products, discover buying trends, maintain contact information, select merchandise and retail stores, choose a restaurant, vet online merchants and auction sites, and/or perform other actions or achieve other objectives using social networks.

In accordance with some implementations, the Core Product may include one or more of the following integrated components:

1) The NQ Wizard™ Email Relationship Finder™, a lightweight downloadable, program that "discovers" and maps the users Nexus from the email header information in the users stored email correspondence;
2) The NQ.com™ website, where users can access, explore & search their "Nexus" map, invite others to join their Nexus, and maintain their "Business card" for others to view; and,
3) The NQ.com™ Nexus Relevant Search™ where, through a secure, standards based interface, participating websites can leverage the NQ.com database as an "infrastructure component" to provide their visitors valuable "Nexus Relevant Search Results."

Once a critical mass of users has been achieved, additional services may be provided based upon the aggregate nexus information contained in the global database.

Initially the target user market may be users of Microsoft Outlook and Outlook express (estimated at over 75 million users . . . 57% of the installed email "clients"). Future releases may expand product compatibility to other "web" and "client" email interfaces. The NQ.com™ software, while valuable to the stand alone user, becomes much more valuable to those who, with the "owners" permission, can access the contact relationships of other users they know.

The initial target market of participating third party websites includes any site where searches for individuals are performed (or where individuals are offering products, services or information) and where a visitors knowledge of a "connection" to those individuals would be valuable. Recommendation, referral, endorsement, criticism and disapproval all are much more meaningful when they come from someone you know personally. Even the opinion of a friend of a friend of a friend may often carry more weight than the newspaper or TV advertisement. Often, the mere knowledge that someone you know owns an item or has seen a movie may provide motivation to consider buying or not buying. A few obvious examples of potential participating sites include dating sites, auction sites, social networking sites, and employment sites. A perhaps less obvious market that has significant potential involves enhanced pay per click search results where social network proximity to the visitor is factored into, and displayed with, the search result listing, thus providing much better qualified leads to the advertiser.

Initial recruitment of participating websites may involve a revenue sharing arrangement as incentive for their early involvement. Once a "critical mass" of subscribers is reached, this may change to an additional revenue source as the value provided to these websites becomes evident. As examples of this, consider the following "shopping" experiences and how NQ.com provides a valuable service to the participating websites:

1) An Ebay.com shopper wishing to make an offer on a high price item first uses NQ.com to learn that she is only three introductions away from the seller and is much more comfortable with the purchase decision.
2) An individual with a new health insurance plan is looking for a doctor that is "in-network." While on the insurance company's website the insured uses NQ.com to list all "in-network" doctors that are within two introductions away.
3) While on Monster.com an executive uses NQ.com to filter results to only include prospective employees that are within two introductions in the company's combined NQ Trust database.

4) A first time homebuyer uses NQ.com on a Weichert Realtors website to find a broker that is one introduction away through a good friend.

5) A recent college grad in a new city joins Friendster to make new acquaintances. By using NQ.com first to find out who he already knows in the Friendster.com network the website becomes useful to him the very first time he logs on . . . even before he starts manually growing his Friendster network.

NQ.com™; the NQ Wizard™; and Nexus Relevant Search™

As mentioned above, in some implementations, CoNeXus Software™, Inc.'s core product group may include one or more integrated components. These integrated components may include, for example, NQ Wizard™ Email Relationship Finder™, NQ.com™ website, NQ.com™ Nexus Relevant Search™, and/or other components.

The NQ Wizard™ Email Relationship Finder™, available at the NQ.com website, is a "lightweight" downloadable program that automatically extracts email addresses and communication relationships from email messages that are saved in the user's email "folders" (initially for Outlook and Outlook Express) and saves this information to a secure, central relational database. The information extracted includes the date of communication and the "From:," "To:" and "Cc:" address relationships from email headers and the many levels of nested (forwarded) messages. This method of data extraction goes far beyond obtaining the data that would typically be found in a users contact folder in that extensive communication relationships between third parties (many of whom are not known to the user) are also discovered. The source of the relationship information extracted from the users email correspondence remains the users personal and private "property" and is only shared to the extent specified by the user.

The NQ.com™ website, where users can build, access, explore & search a map of their personal network (their "Nexus"), invite others to join their Nexus, and maintain their "Business card" for others to view. A visual display provides information about degrees of separation, frequency of contact, and recency of contacts for all communications and allows for determination and display of multiple paths of introduction to targeted addresses in a clear and actionable format. Users have the option of targeting email addresses specifically or by broadening the search to look for all contacts based upon freeform text searches.

The NQ.com™ Nexus Relevant Search™ allows participating websites to utilize the NQ.com™ database as an "infrastructure component" through a secure standards based interface, in order to provide their visitors valuable "Nexus Relevant Search Results." Examples include searching for known paths of introduction to a specific seller of merchandise at an auction site, or to restricting search results when looking for a local real estate broker to include only those individuals that are "known" to you within "x" number of introductions. Since recommendations, referrals, or endorsements are all much more meaningful when they come from someone you know personally, even when it is through a friend of a friend of a friend, the value of pay per click search results are enhanced when accompanied by paths of introduction.

NQ.com Screen Shots

The NQ Wizard

The NQ Wizard discovers all available folders in the users Outlook and Outlook Express® files. See FIG. 15.

Next, the NQ Wizard parses the header information used build the user's relationship tree from all of the email correspondence in those folders, at a typical average rate of over 10 emails per second. See FIG. 16.

Finally, the NQ Wizard builds the user's network by uploading the relationship pairs to a central server, rebuilds the user's relationship tree, and then creates a synchronization file on the local machine so that emails are not rescanned the next time the NQ Wizard is run. See FIG. 17

NQ.com

After a user runs the NQ Wizard they immediately have access to their data online from a password protected website at www.nq.com. See FIGS. 18 and 19.

The NQ Search page allows a user to search by "degrees of separation," or to enter a text string (top), or to dynamically browse their network using the NQ Explorer (bottom). See FIG. 20.

Drill down search results provides available business card information as well as detailed graphical "paths of introduction" showing recency and frequency of communication for each link in the introduction chain. See FIG. 21.

User defined settings allow users to control how, and if, they connect their NQ database to other NQ.com subscribers that they know. Current NQ.com subscribers that have direct connections with the user are suggested as "Nexus" candidates. Non-subscribers who have direct communications with the user, and who appear often in other users networks, are suggested as valuable potential users who should be invited to the NQ.com service. See FIG. 22.

Product Pricing and Revenue Model

The NQ.com™ product may have a free and a paid subscription option. With the free subscription, users can download the NQ Wizard™, build their personal Nexus from their email communications and have full access to the NQ Search™ and display tools. When visiting a participating website, NQ.com™ free subscription members may only see limited information in search results regarding proximity to the user.

The NQ.com™ paid subscription adds the ability for users to form NQ Trusts and to see detailed path of introduction information in search results when visiting participating websites. The NQ Trusts™ functionality allows users to combine their data with others they know to dramatically increase the reach of their nexus.

For non-subscribers visiting a participating website, search results will often yield positive hits since email addresses exist and relationship information is often available in the "relationship trees" (i.e., the Nexus) of other users. In this case however, to honor the privacy of the data, the information displayed to non-subscribers may be limited to very general summary data and the user may be encouraged to join NQ.com to see the more detailed results that will be available once their data is included.

In addition to paid subscriptions, pay per click revenue opportunities will quickly become available as the database grows and search results can be enhanced with filters that bring individuals to the top of search result listings based upon proximity to the user.

Cost of Delivery and Marketing Costs

Costs of delivery of the product and database access are expected to be negligible on an incremental basis once breakeven is achieved. All documentation is provided on-line and client-side software is only available as a download. Fulfillment and service costs are therefore limited to customer communication and support, bandwidth costs, server maintenance, database maintenance, server amortization, credit card processing fees and merchant account fees. An intuitive graphical user interface and very few installation and setup options will insure the minimum of customer service needs.

Marketing costs are also expected to be incrementally negligible after the initial product introduction due to the viral nature of the product in normal use. In addition, with a relatively small subscriber base our global database will contain a sufficient number of connections so that the Nexus Relevant Search™ will have meaningful value and the "free" exposure from distribution partners will become significant.

Target Markets for "Users" and "Partners"

Initially the target market for users may consist of all users of Microsoft Outlook and Outlook express, currently estimated at over 57% of installed email "clients" and growing . . . the number of seats deployed of Microsoft Exchange alone is estimated at over 75 million. (March 2001 Ferris Research Corporate e-mail Market Survey.) The product design and architecture anticipates that future releases would expand product compatibility to other "web" (i.e., Hotmail, Yahoo . . . ) and "client" (i.e., Lotus Notes, Eudora . . . ) email interfaces and could include a "hosted" version that web email service providers can offer their clients without the need of a downloaded component.

The initial target market for participating websites consists of any site where searches for individuals are performed or where individuals offer products, services or information. There are many websites with these characteristics with immediate opportunities falling into several categories. Examples of such categories may include one or more of the following:
 1) Directory & Information sites such as Ziggs, Eliyon, Jigsaw and Classmates.
 2) Dating sites such as Match, eHarmony, jDate, Lavalife, and Yahoo!
Personals.
 3) Networking sites such as MySpace, Friendster, LinkedIn, and Ryze Interest Group Portals and Community Interest sites such as MeetUp, Fotolog, Evite, Craig's List and eCademy.
 4) Job Search & Recruiting sites such as Monster, CareerBuilder, and Recruitmax.
 5) Auction and Third Party Sales sites such as eBay and Amazon. (Consumer fraud on auction sites represented 16% of Internet related grievances to the FTC in 2004 . . . imagine how this would be reduced if buyers knew paths of introduction to who they were buying from.)
 6) "List of Professionals" sites such as "find an agent" on real estate sites or "find a doctor" on insurance company sites.
 7) Review or Commentary sites from visiting "posters" such as with movie or book reviews (i.e., moviephone, fandango, Amazon) or as on political blogs. Future Enterprise Markets A secure enterprise solution may be provided that may run on a local dedicated server, and that builds a database that includes data from the email of all of the company's employees. Applications in this environment may include sales prospecting, human resources recruitment efforts, communications workflow analysis, and security monitoring of communications.

Future Products and Licensing Opportunities

Once a critical mass of NQ.com™ users has subscribed, and the central database begins to represent a relatively small but meaningful percentage of the total email user population, there are significant opportunities for product line extensions that can generate additional revenue with relatively small related costs. These product line extensions include: Opportunities to develop and market additional related software products; opportunities to license patented technology, and; opportunities to collect use and access fees from third parties who develop and market software that integrate the NQ.com™ database as an integral component of their product. A few examples of possible future products include Affinity Finder, Referral Marketing Tools, Referral Services, Email Address Scoring Service, Early Adopter Identifier, Cascade Predictor Services, and/or other products.

An Affinity Finder would allow users looking to establish a relationship with an affinity group to find group members they know or can gain introduction to. The range of potential affinity group memberships is nearly unlimited and clearly provides potential benefit to both the affinity group and the NQ.com™ user looking to gain affiliation. The NQ.com™ tool can be used bi-directionally, as in alumni groups reaching out to potential members for membership or donation participation and conversely by alumni choosing between alumni groups based upon membership relationships. More personal affinity group relationships, as in medical illness support groups, or social support groups, can creatively employ the NQ.com™ tool allowing new potential members to anonymously look for "personally linked" members of the group and then decide whether or not to make their affliction known based on their individual needs and preferences.

Referral Marketing Tools would allow users to market products to members of their "relationship tree" through qualified referrals from people they know. Other tools can be offered to track multi-level marketing (MLM) points or earnings as a third party service to users.

Referral Services allow participating commerce websites to offer their customers the ability to share their shopping experience with NQ.com Members to whom they are linked to. Recommendation, referral, endorsement, criticism and disapproval all are much more meaningful when they come from someone you know personally . . . . Even when it is a friend of a friend of a friend. This functionality is especially important for auction sites, such as eBay.com, where the seller is essentially unknown except for the "ratings" that other unknown individuals posted. With Referral Services ratings can be searched for those posted by individuals in you relationship tree for a much greater level of confidence.

An Email Address Scoring Service is a product that would help to reduce on-line fraud. Often email addresses are registered for the purpose of fraudulently obtaining merchandise or services. The correspondence patterns associated with these email addresses are usually very different than those of addresses used for normal correspondence. The envisioned NQ.com™ Service would be a merchant to merchant online subscription service that provides "email confidence scores" based on correspondence frequency, recency, and scope of contacts (without specifically divulging any private information). On-line merchants can use this information to determine the amount of information they require from a customer prior to authorizing a sale.

Early Adopter Identifier and Cascade Predictor Services would provide tools and an interface to the mature NQ.com™ database that uses the global, aggregated relationship tree to identify nodes of early adopters of products and services. Product acceptance cascades can be predicted by tracking product sales to "influential early adopters" and their contacts. We believe that this method has far reaching potential for many types of purchases where large volumes of purchase data can be linked to email addresses.

Figure 23:
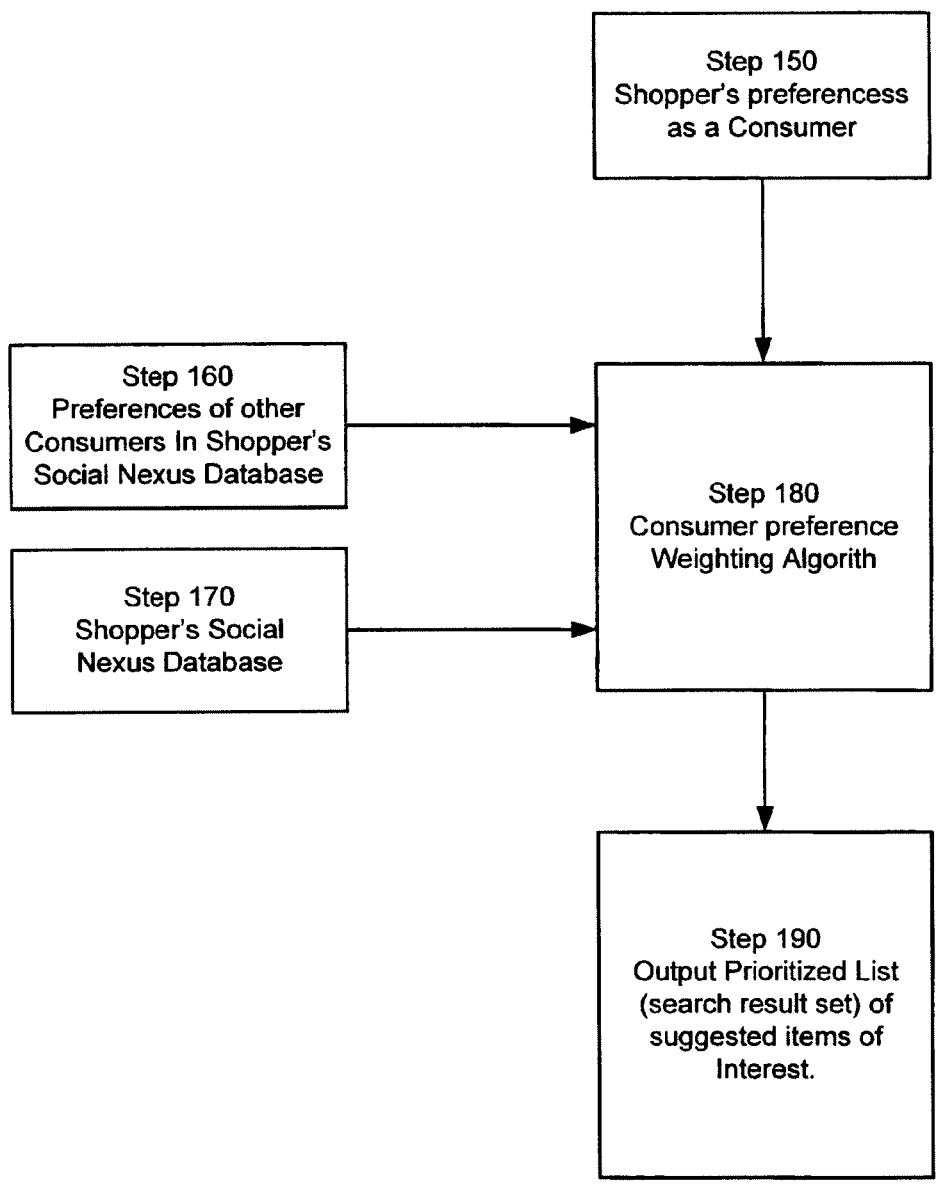
FIG. 23 is a flow chart showing the operation of search results that are generated, filtered and/or prioritized in accordance with the relative proximities of related contact information and the preferences and/or attributes of those contacts, in accordance with one or more implementations.

Referring now to FIG. 23, as noted above, search results may be filtered, displayed and/or prioritized in accordance with contact information derived from correspondence information including address paths, such as emails. In a similar way, search results may be generated by looking both at the social proximity between contacts (and/or between the searcher and a contact) and the preferences, associations, attributes, web surf history, interests and/or other chosen or innate characteristic of the contacts in the database.

The direct mail and online marketing industries have invested much effort into predicting buying patterns of prospective customers based upon the prior purchase history of the prospective customer and their geographic (demographic) neighbors. Some internet sites suggest additional items to purchase based upon current "shopping cart" items (i.e., others who have bought item X have also purchased items P, Q and R). Independently from these "predictors," there is an inherent endorsement that is silently communicated (and that influences the buying decision) when an individual observes an acquaintance or a celebrity, acquiring or utilizing, a product or service.

Such characteristics of consumer preference influencers and predictors may also be combined with the "social nexus database" described herein to provide a method of selecting, filtering, and sorting lists of items for presentation to prospective consumers. That is, the user's Social Nexus provides the identification of "like minded" consumers, connected to the potential consumer, linked with individual consumer preference data, which may have greater influence than the chance endorsement by acquaintances.

In the alternate implementation of the invention shown in FIG. 23, an individual consumer's preferences as a shopper in a particular topic, such as music, may be ascertained in step 150 by, for example, analysis of prior purchase history, current "shopping cart" items, questionnaire, or other techniques. Consumer preferences for any product, service, attribute, experience, web sites visited, etc. that can be used as a predictor of additional consumer preference or desire may also be derived. In step 160, a database may be accessed, and/or is maintained, of similar consumer preferences for other persons in the shopper's social nexus database. This database may include information such as actual purchase history, questionnaire responses, etc.

In step 180, a weighting algorithm may be applied that selects and filters items for presentation to the individual shopper or consumer, based upon that individual consumer's preferences as derived in step 150, the other related or connected consumer's preferences as derived in step 160 and the proximity of those other consumers to the individual consumer as determined, for example, in step 170 from that individual consumer's social nexus as described above.

The output data provided in step 190 may be provided to the individual consumer in the form of result sets which include one or more of:
1) Others you know (without identifying "others") who like the items you like also like these items . . . .
2) Others you know (with identifying "others") who like the items you like also like these items . . . .
3) Others who you know that have similar likes to you are . . . .
4) Others who you can gain introduction to through those that you know, and that have similar likes to you, are . . . .

Alternately, or additionally, the result sets may be provided without weighting provided by the shopper's preference in step 150 to produce output result sets of the form of one or more of:
1) Others you know (without identifying "others") like these items . . . .
2) Others you know (with identifying "others") like these items . . . .

This method is not limited to a physical product and may be applied to produce result sets which include RSS feeds, web sites visited, vacation spots, or any other product, service, attribute, or experience that can be reasonably identified and who's preference can be predicted by prior actions, affiliations, interests, innate traits or characteristics, and/or associated preferences.

Figure 24:
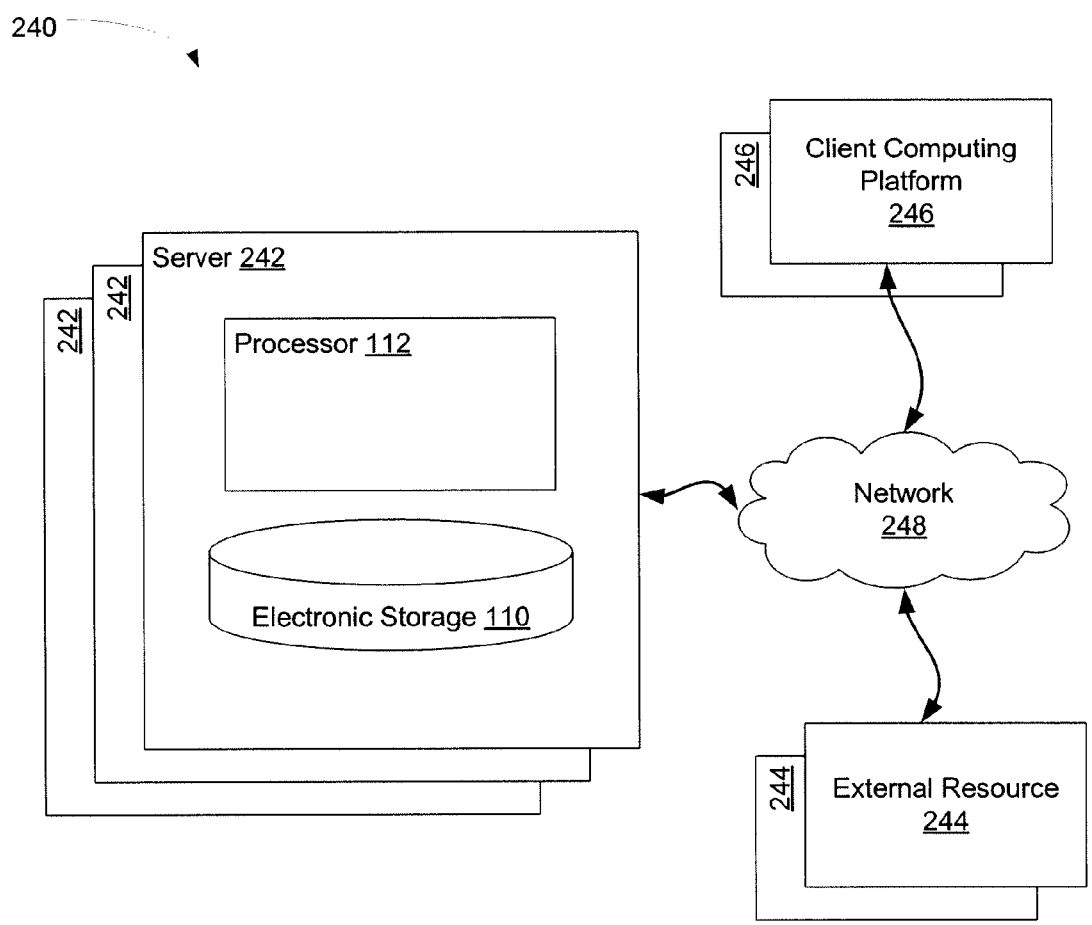
FIG. 24 illustrates a system that may embody one or more implementations.

FIG. 24 illustrates a system 240 that may embody one or more implementations. In some implementations, the system 240 may include one or more server 242 and/or other components. The system 240 may operate in communication and/or coordination with one or more external resources 244. Users may interface with the system 240 and/or the external resources 244 via client computing platforms 246. Components of the system 240, the server(s) 242, the external resources 244, and/or the client computing platforms 246 may be operatively linked via one or more electronic communication links. For example, such electronic communication links may be established, at least in part, via a network 248, which may include the Internet and/or other networks. It will be appreciated that this is not intended to be limiting, and that the scope of this disclosure includes implementations in which the server(s) 242, the external resources 244, and/or the client computing platforms 246 are operatively linked via some other communication media.

A given client computing platform 246 may include one or more processors configured to execute computer program modules. The computer program modules may be configured to enable one or more users associated with the given client computing platform 246 to interface with the system 240 and/or the external resources 244, and/or provide other functionality attributed herein to client computing platforms 246. For example, a given client computing platform 246 may be facilitate electronic communication by one or more users. Such electronic communication may include email accounts and/or other forms of electronic communication. By way of non-limiting example, the given client computing platform 246 may include one or more of a desktop computer, a laptop computer, a handheld computer, a NetBook, a Smartphone, and/or other computing platforms.

Individual ones of the client computing platforms 246 may include user interfaces. A user interface included in a given client computing platform 246 may be configured to provide an interface between the server(s) 242 and a user of the given client computing platform 246 through which the user may provide information to and/or receive information from the server(s) 242. This enables communications, data, results, and/or instructions and any other communicable items, collectively referred to as "information," to be communicated between the user and server(s) 242. Exemplary information provided to and/or received from the server(s) 242 via a user interface of one of the client computing platforms 246 may include email, other textual communication and/or information, and/or other information. Examples of interface devices suitable for inclusion in a user interface of one of the client computing platforms 246 include one or more of a keypad, buttons, switches, a keyboard, knobs, levers, a display screen, a touch screen, speakers, a microphone, an indicator light, an audible alarm, and/or a printer. It is to be understood that other communication techniques, either hard-wired or wireless, are also contemplated by the present invention as a user interface of individual ones of the client computing platforms 246. As such, any technique for communicating information with the server(s) 242 is contemplated by the present invention as a user interface a given client computing platform 246.

The external resources 244 may include sources of information, hosts and/or providers of communication means of the system 240, external entities participating with the system 240, and/or other resources. In some implementations, some or all of the functionality attributed herein to the external resources 244 may be provided by resources included in the system 240.

The server(s) 242 may comprise electronic storage 250, one or more processors 252, and/or other components. The server(s) 242 may include communication lines, or ports to enable the exchange of information with a network and/or other computing platforms. Although system 240 may be described in certain sections herein as including server(s) 242, this is not intended to be limiting. The server(s) 242 may be separate and distinct from the system 240, and may be provided by an entity that is separate from, for example, one or more components of the system 240.

The electronic storage 250 may comprise electronic storage media that electronically stores information. The electronic storage media of the electronic storage 250 may include one or both of system storage that is provided integrally (i.e., substantially non-removable) with the server(s) 242 and/or removable storage that is removably connectable to the server(s) 242 via, for example, a port (e.g., a USB port, a firewire port, etc.) or a drive (e.g., a disk drive, etc.). The electronic storage 250 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 250 may store software algorithms, information determined by processors 252, information received from client computing platforms 246, information received from the external resources 244, and/or other information that enables the server(s) 242 to function as described herein. According to various implementations, electronic storage 250 may include one or more of a web-based database, a relationship tree database, a universal discover description database, a relational database, and/or other database.

The processor(s) 252 may be configured to provide information processing capabilities in the virtual environments servers 102. As such, the processor 252 may include one or more of a digital processor, an analog processor, a digital circuit designed to process information, an analog circuit designed to process information, a state machine, and/or other mechanisms for electronically processing information. Although the processor 252 is shown in FIG. 24 as a single entity, this is for illustrative purposes only. In some implementations, processor 252 may include a plurality of processing units. These processing units may be physically located within the same device, or the processor 252 may represent processing functionality of a plurality of devices operating in coordination.

As is shown in FIG. 24, the processor 252 may be configured to execute one or more computer program modules and/or instructions that perform one or more operations disclosed herein. The processor 252 may be configured to execute computer program modules by software; hardware; firmware; some combination of software, hardware, and/or firmware; and/or other mechanisms for configuring processing capabilities on the processor 252.

In accordance with one or more implementations, the processor 252 may be configured to execute computer program modules in order to analyze a set of email correspondence received by a first user, individual ones of the set of email correspondence including a primary communication directed to the first user and one or more forwarded email correspondences appended to the primary communication; identify at least a second user and a third user from the one or more forwarded email correspondences, the second user and the third user being excluded from the primary communication of individual ones of the set of email correspondence received by the first user; designate the second user and the third user as having a relationship that does not directly include the first user; and update a relational database with the relationship between the second user and the third user.

In some implementations, the processor 252 may be configured to execute computer program modules in order to associate a unique identification with individual ones of the set of email correspondence. The processor 252 may be configured to execute computer program modules in order to utilize the unique identification to detect duplicate email correspondences within the set of email correspondence. The processor 252 may be configured to execute computer program modules in order to determine a frequency of communication between the second user and the third user based on the one or more forwarded email correspondences. The processor 252 may be configured to execute computer program modules in order to assign a relationship strength value to the relationship between the second user and the third user based on the frequency of communication. The processor 252 may be configured to execute computer program modules in order to provide, for presentation via a client computing platform, a visual representation of the relationship between the second and the third user. The processor 252 may be configured to execute computer program modules in order to: identify at least a fourth user and a fifth user from the one or more forwarded email correspondences, the fourth user and the fifth user being excluded from the primary communication of individual ones of the set of email correspondence received by the first user; designate the fourth user as having one or more relationships with one or more of the second user, the third user, or the fifth user, the one or more relationships that include the fourth user not directly including the first user; and update the relational database with the one or more relationships that include the fourth user. The processor 252 may be configured to execute computer program modules in order to analyze the set of email correspondence received by the first user to determine one or more of skills, experience, or a shopping experience associated with one or more other users including the second user and the third user. The processor 252 may be configured to execute computer program modules in order to analyze the set of email correspondence received by the first user to determine patterns of correspondence associated with one or more other users including the second user and the third user.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any implementation can be combined with one or more features of any other implementation.

What is claimed is:

1. A computer-implemented method for extracting indirect relational information from email correspondence, the method comprising:
    analyzing a set of email communications addressed to a first user to identify a subset of email communications within the set that each have a primary communication addressed to the first user and a thread of other email communications appended to the primary communication, the primary communication being more recent in time relative to the other email communications in the thread;
    analyzing a first email communication of the subset of email communications to identify at least a second user and a third user from the other email communications in the thread appended to the primary communication of the first email communication, the second user and the third user being unlisted as recipients of the primary communication of the first email communication;
    designating the second user and the third user as having a relationship that does not directly include the first user; and
    updating a relational database with the relationship between the second user and the third user.

2. The method of claim 1, further comprising associating a unique identification with individual ones of the set of email communications.

3. The method of claim 2, further comprising utilizing the unique identification to detect duplicate email communications within the set of email communications.

4. The method of claim 1, further comprising determining a frequency of communication between the second user and the third user based on the one or more forwarded email correspondences.

5. The method of claim 4, further comprising assigning a relationship strength value to the relationship between the second user and the third user based on the frequency of communication.

6. The method of claim 1, further comprising providing, for presentation via a client computing platform, a visual representation of the relationship between the second and the third user.

7. The method of claim 1, further comprising:
    analyzing a second email communication of the subset of email communications to identify at least a fourth user and a fifth user from the other email communications in the thread appended to the primary communication of the second email communication, the fourth user and the fifth user being unlisted as recipients of the primary communication of the second email communication;
    designating the fourth user as having one or more relationships with one or more of the second user, the third user, or the fifth user, the one or more relationships that include the fourth user not directly including the first user; and
    updating the relational database with the one or more relationships that include the fourth user.

8. The method of claim 1, further comprising analyzing the set of email communications addressed to the first user to determine one or both of skills or experience associated with one or more other users including the second user and the third user.

9. The method of claim 1, further comprising analyzing the set of email communications addressed to the first user to determine a shopping experience associated with one or more other users including the second user and the third user.

10. The method of claim 1, further comprising analyzing the set of email communications addressed to the first user to determine patterns of correspondence associated with one or more other users including the second user and the third user.

11. A system configured for extracting indirect relational information from email correspondence, the system comprising:
    one or more processors configured to:
        analyze a set of email communications addressed to a first user to identify a subset of email communications within the set that each have a primary communication addressed to the first user and a thread of other email communications appended to the primary communication, the primary communication being more recent in time relative to the other email communications in the thread;
        analyze a first email communication of the subset of email communications to identify at least a second user and a third user from the other email communications in the thread appended to the primary communication of the first email communication, the second user and the third user being unlisted as recipients of the primary communication of the first email communication;
        designate the second user and the third user as having a relationship that does not directly include the first user; and
        update a relational database with the relationship between the second user and the third user.

12. The system of claim 11, wherein the one or more processors are further configured to associate a unique identification with individual ones of the set of email communications.

13. The system of claim 12, wherein the one or more processors are further configured to utilize the unique identification to detect duplicate email communications within the set of email communications.

14. The system of claim 11, wherein the one or more processors are further configured to determine a frequency of communication between the second user and the third user based on the one or more forwarded email correspondences.

15. The system of claim 14, wherein the one or more processors are further configured to assign a relationship strength value to the relationship between the second user and the third user based on the frequency of communication.

16. The system of claim 11, wherein the one or more processors are further configured to provide, for presentation via a client computing platform, a visual representation of the relationship between the second and the third user.

17. The system of claim 11, wherein the one or more processors are further configured to:
    analyze a second email communication of the subset of email communications to identify at least a fourth user and a fifth user from the other email communications in the thread appended to the primary communication of the second email communication, the fourth user and the fifth user being unlisted as recipients of the primary communication of the second email communication;
    designate the fourth user as having one or more relationships with one or more of the second user, the third user, or the fifth user, the one or more relationships that include the fourth user not directly including the first user; and update the relational database with the one or more relationships that include the fourth user.

18. The system of claim 11, wherein the one or more processors are further configured to analyze the set of email communications addressed to the first user to determine one or more of skills, experience, or a shopping experience associated with one or more other users including the second user and the third user.

19. The system of claim 11, wherein the one or more processors are further configured to analyze the set of email communications addressed to the first user to determine patterns of correspondence associated with one or more other users including the second user and the third user.

20. A computer-readable storage medium having instructions embodied thereon, the instructions being executable by a processor to perform a method for extracting indirect relational information from email correspondence, the method comprising:

analyzing a set of email communications addressed to a first user to identify a subset of email communications within the set that each have a primary communication addressed to the first user and a thread of other email communications appended to the primary communication, the primary communication being more recent in time relative to the other email communications in the thread;

analyzing a first email communication of the subset of email communications to identify at least a second user and a third user from the other email communications in the thread appended to the primary communication of the first email communication, the second user and the third user being unlisted as recipients of the primary communication of the first email communication;

designating the second user and the third user as having a relationship that does not directly include the first user; and updating a relational database with the relationship between the second user and the third user.

\* \* \* \* \*